(12) United States Patent
Yalei et al.

(10) Patent No.: US 8,310,195 B2
(45) Date of Patent: Nov. 13, 2012

(54) METHOD FOR IMPROVING MOTION TIMES OF A STAGE

(75) Inventors: Sun Yalei, Singapore (SG); Uday Nayak, San Jose, CA (US); Richard J. Casler, Jr., Cambridge, MA (US); Thomas Rohrs, Los Altos, CA (US)

(73) Assignee: FormFactor, Inc., Livermore, CA (US)

( * ) Notice: Subject to any disclaimer, the term of this patent is extended or adjusted under 35 U.S.C. 154(b) by 0 days.

(21) Appl. No.: 13/397,624

(22) Filed: Feb. 15, 2012

(65) Prior Publication Data

US 2012/0146569 A1 Jun. 14, 2012

Related U.S. Application Data

(63) Continuation of application No. 12/334,378, filed on Dec. 12, 2008, now Pat. No. 8,120,304.

(51) Int. Cl.
*B64C 17/062* (2006.01)

(52) U.S. Cl. .......... 318/649; 318/560; 318/561; 73/105

(58) Field of Classification Search .............. 318/649, 318/575, 569, 560, 561, 567; 73/105; 324/758
See application file for complete search history.

(56) References Cited

U.S. PATENT DOCUMENTS

| | | |
|---|---|---|
| 5,410,259 A | 4/1995 | Fujihara et al. |
| 5,422,579 A | 6/1995 | Yamaguchi |
| 5,436,571 A | 7/1995 | Karasawa |
| 5,449,985 A | 9/1995 | Kanemitsu et al. |
| 5,550,483 A | 8/1996 | Boyette et al. |
| 5,644,245 A | 7/1997 | Saitoh et al. |
| 5,814,733 A | 9/1998 | Khoury et al. |
| 6,040,700 A | 3/2000 | Berar |
| 6,040,893 A | 3/2000 | Ebinuma |
| 6,096,567 A | 8/2000 | Kaplan et al. |
| 6,111,421 A | 8/2000 | Takahashi et al. |
| 6,118,515 A | 9/2000 | Wakamoto et al. |
| 6,331,885 B1 | 12/2001 | Nishi |
| 6,335,532 B1 | 1/2002 | Tanaka et al. |
| 6,559,459 B2 | 5/2003 | Tanaka et al. |

(Continued)

FOREIGN PATENT DOCUMENTS

DE 10 2004 057776 A1 7/2005

(Continued)

OTHER PUBLICATIONS

PCT Notification of Transmittal of the International Search Report and The Written Opinion of this International Searching Authority, or the Declaration; International Application No. PCT/US2006/042343 mailed May 4, 2007, total 12 pages.

(Continued)

*Primary Examiner* — Paul Ip
(74) *Attorney, Agent, or Firm* — Blakely, Sokoloff, Taylor & Zafman LLP

(57) ABSTRACT

Methods and systems for, in one embodiment, accelerating a stage through a clearance height in a first direction and decelerating the stage in the first direction while accelerating in a second direction are shown. The stage is moved in a third direction and a determination is made whether the stage movement in the second direction is below a threshold value before continuing to move the stage further in the third direction. The first direction is perpendicular to the second direction and is parallel and opposite to the third direction.

25 Claims, 15 Drawing Sheets

U.S. PATENT DOCUMENTS

| | | |
|---|---|---|
| 6,710,850 B2 | 3/2004 | Yamaguchi et al. |
| 6,744,057 B2 | 6/2004 | Tanaka et al. |
| 6,885,012 B2 | 4/2005 | Tanaka et al. |
| 7,119,560 B2 * | 10/2006 | Nihei et al. ............. 324/750.19 |
| 7,352,198 B2 | 4/2008 | Nayak et al. |
| 7,362,116 B1 | 4/2008 | Nayak et al. |
| 7,852,458 B2 | 12/2010 | Kosugi |
| 7,963,153 B2 * | 6/2011 | Wang et al. ...................... 73/105 |
| 8,120,304 B2 * | 2/2012 | Yalei et al. .................... 318/649 |
| 2001/0003968 A1 | 6/2001 | Kitano et al. |
| 2002/0053643 A1 | 5/2002 | Tanaka et al. |
| 2002/0080041 A1 | 6/2002 | Ohno et al. |
| 2002/0100853 A1 | 8/2002 | Okada |
| 2002/0109824 A1 | 8/2002 | Yamaguchi et al. |
| 2003/0197130 A1 | 10/2003 | Tanaka et al. |
| 2003/0197850 A1 | 10/2003 | Sekiguchi |
| 2004/0095563 A1 | 5/2004 | Korenaga |
| 2004/0100297 A1 | 5/2004 | Tanioka et al. |
| 2005/0083073 A1 * | 4/2005 | Nihei et al. .................... 324/758 |
| 2005/0253613 A1 | 11/2005 | Komatsu et al. |
| 2007/0194741 A1 | 8/2007 | Sekiguchi |
| 2008/0013089 A1 | 1/2008 | Ishii et al. |
| 2008/0143994 A1 | 6/2008 | Shibazaki |
| 2009/0028683 A1 | 1/2009 | Zywno et al. |
| 2009/0033896 A1 | 2/2009 | Nagasaka |
| 2009/0103579 A1 | 4/2009 | Ushimaru et al. |
| 2009/0139315 A1 * | 6/2009 | Wang et al. ...................... 73/105 |
| 2009/0246655 A1 | 10/2009 | Touya |
| 2009/0287341 A1 * | 11/2009 | Monteen et al. .............. 700/121 |
| 2009/0296054 A1 | 12/2009 | Kono et al. |
| 2009/0316133 A1 | 12/2009 | Shibazaki |

FOREIGN PATENT DOCUMENTS

| | | |
|---|---|---|
| EP | 1 069 437 A1 | 1/2001 |
| JP | 07-161614 | 6/1995 |
| JP | 10-097989 | 4/1998 |
| JP | 11-168063 | 6/1999 |
| JP | 2000-138241 | 5/2000 |
| JP | 2003-059806 | 2/2003 |
| JP | 2005-123220 | 5/2005 |

OTHER PUBLICATIONS

PCT/US2009/067595, International Search Report and Written Opinion of the International Searching Authority, Jul. 7, 2010, 8 pages.

* cited by examiner

METHOD FOR IMPROVING MOTION TIMES OF A STAGE

RELATED APPLICATIONS

This is a continuation of application Ser. No. 12/334,378, filed on Dec. 12, 2008 now U.S. Pat. No. 8,120,304, entitled "Method For Improving Motion Times Of A Stage", and is related to U.S. patent application Ser. No. 11/335,081 entitled "Methods and Apparatuses for Improved Stabilization in a Probing System" by Nayak et al., filed on Jan. 18, 2006, which is incorporated herein by reference in its entirety.

FIELD OF THE INVENTION

This invention relates to systems and methods for improving the motion times of a stage during probing, inspection, assembly, or manufacturing of a component.

BACKGROUND OF THE INVENTION

Probing involves contacting a pad surface of an integrated circuit with a probe tip. The process involves positioning of probe pads relative to probe tips. The positioning of probe pads, in one system, is achieved by moving the wafer containing the devices under test. From a set of pads under test to the next set of pads, the motion consists of moving the pads away from the pins, moving the wafer such that the next set of pads are under the probe tips, and moving the pads toward the probe tips to make contact with the probe tips.

Since extreme precision is involved in positioning the pads under the pins, it is necessary to control the mechanical motion of the wafer precisely. Any unwanted motion in cross directions can damage the device under test. Consequently, extreme care is taken to ensure that mechanical motions are well controlled before making contact with the probe tips.

FIG. 1a shows a common stage motion profile 20 where a stage moves from a contact position 22 to a clearance height position 24 by single axis motion (often in a vertical or "Z" direction). The clearance height is defined as the height at which the stage can be moved safely without damaging system components. The stage then moves to another commanded stage position 26, equal to the height of the clearance height, whereafter the stage moves to another contact position 28. The entire motion profile 20 is shown by three line segments 30, 32, 34.

FIG. 1b shows an acceleration profile superimposed on the segments 30, 32, 34. The first acceleration profile has two segments 36, 38 that can be viewed with reference to the acceleration axis a1 and distance axis d1. The second acceleration profile having two segments 40, 42 can be viewed with reference to the acceleration axis a2 and distance axis d2. The third acceleration profile having two segments 44, 46 can be viewed with reference to the acceleration axis a3 and distance axis d3. The segments 36, 38, 40, 42, 44, and 46 do not represent a direction of movement; rather, they show periods of acceleration or deceleration.

The first acceleration profile shows an acceleration 36 to a midpoint 48 being equidistant between the contact position 22 and clearance height position 24. After reaching the midpoint 48 distance, the stage decelerates during the second segment 38 until the stage reaches a stopping point at the clearance height 24. It will be understood that the only motion which occurs in the first acceleration profile is a vertical motion which includes both a period of acceleration (segment 36) and a period of deceleration (segment 38). The second acceleration profile shows an acceleration 40 and a deceleration 42 with a midpoint 50. It will be understood that the only motion which occurs in the second acceleration profile is a horizontal motion which includes both a period of acceleration (segment 40) and a period of deceleration (segment 42). The third acceleration profile has an acceleration 44 and a deceleration 46 to arrive at another contact position 28. It will be understood that the only motion which occurs in the third acceleration profile is a vertical motion which includes both a period of acceleration (segment 44) and a period of deceleration (segment 46).

Therefore, in the Z-direction, half of the movement in the Z-direction is spent accelerating while the other half of the movement in the Z-direction is spent decelerating.

The single axis motion described requires a verification that motion is complete and disturbances are minimized before moving the wafer in the next axis. This is necessary for both wafer and probe card safety.

SUMMARY OF THE DESCRIPTION

Improved methods and systems are provided for increasing the efficiency of a stage motion between two positions. The stage may hold a device under testing or inspection or in a manufacturing process or may hold probe tips or other testing or inspection components. The testing or inspection may be performed vertically or horizontally.

According to one embodiment of an aspect of the invention, a stage is accelerated through a clearance height in a first direction. After the accelerating through the clearance height, the stage is decelerated in the first direction while accelerating the stage in a second direction. The stage is then moved in a third direction.

A determination may be made as to whether the movement in the second direction of the stage is below a threshold value before continuing to move the stage further in the third direction. The first direction is perpendicular to the second direction and parallel and opposite to the third direction.

According to yet another embodiment of another aspect of the invention, a method of moving a stage in a first vertical direction beyond a clearance height is described. The stage continues to move in the first vertical direction and begins to move in a lateral direction. The stage is then moved in a second vertical direction to a settle check point.

According to yet another embodiment of another aspect of the invention, a stage is accelerated in a vertical direction through a clearance height during a first time period and decelerated during a second time period. The first time period is greater than the second time period.

According to yet another embodiment of another aspect of the invention, a machine readable medium having stored thereon data representing sequences of instructions, which when executed by a computer system cause the computer system to perform a method of moving a stage is described.

According to yet another embodiment of another aspect of the invention, a base and stage supported by the base are described. The stage is configured to move in a three-dimensional coordinate system. At least one motor is connected with the stage for moving the stage in the three-dimensional coordinate system. The motor is configured to accelerate the stage through a clearance height in a first direction and the at least one motor is configured to decelerate the stage in the first direction and to accelerate the stage in a second direction simultaneously with decelerating the stage in the first direction. At least one sensor is coupled with the stage and the sensor is configured to measure a stage parameter. A control system is coupled with the at least one sensor. The control system is configured to receive information from the at least one sensor and determines operation parameters of the motor based on a clearance height parameter.

According to yet another embodiment of another aspect of the invention, a support frame and base supported by the support frame is described. A stage supported by the base that is configured to move in a three-dimensional coordinate system having three axis of motion is also described. At least one motor is connected with the stage for moving the stage in the three-dimensional coordinate system. The motor is configured to accelerate the stage through a clearance height in a first axis of motion and decelerate the stage in both the first axis of motion and second axis of motion simultaneously. At least one sensor is coupled with the stage and the sensor is configured to measure a stage acceleration.

The solutions provided by at least certain embodiments of the invention thus results in a system that improves the stage motion time between contact or testing or inspection or manufacturing positions. These and other embodiments, features, aspects, and advantages of the present invention will be apparent from the accompanying drawings and from the detailed description and appended claims which follow.

BRIEF DESCRIPTION OF THE DRAWINGS

The present invention is illustrated by way of example and not limitation in the figures of the accompanying drawings in which like references indicate similar elements and in which.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

At least certain embodiments of the invention may be used to test or inspect a component such as an integrated circuit or a wafer containing a plurality of integrated circuits or a substrate containing one or more other components. The following description is directed to wafer probing, but it will be understood that wafer probing is merely one example of an embodiment of the invention, and that all other examples of other embodiments will not be used for wafer probing.

Wafer probing involves contacting the pad surface with probe tips. Probe tips move or deform during the operation of probing. This action makes the probe tips scrub or slide across the bond pads, balls/bumps or contact surfaces of the wafer being tested. This mechanical action is necessary to break through the contamination and oxide on the probe tips and/or the pads. In addition, a large amount of pressure is used to scrub away an oxide or contamination layer.

In one embodiment of the present invention, a prober system consists of two main components, or stages, one holding a wafer and the other a probe card. The two stages move relative to one another and are brought together in order to create the high pressure contact between the bond pads and the probe tips.

Figure 2:
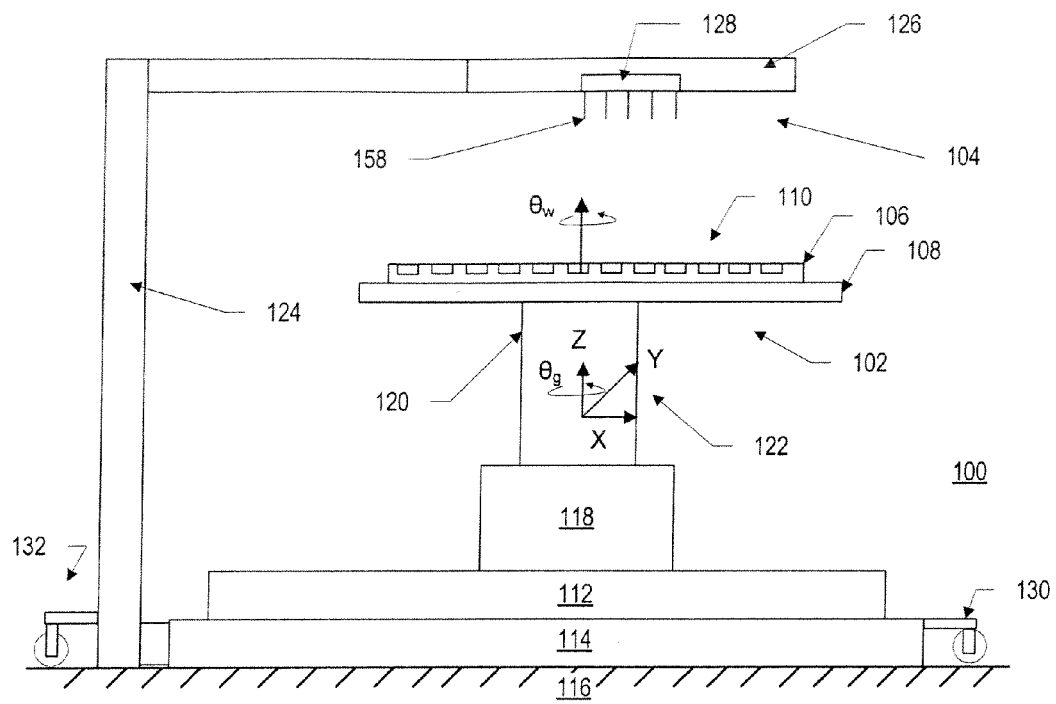
FIG. 2 illustrates a side view of a possible embodiment of a prober testing system and its two main stages.

FIG. 2 shows a schematic of one such possible embodiment of a system 100, comprising of two main stages. The main stages are the wafer holder assembly 102 and the probe-card holder assembly 104. In this illustrative example, the wafer holder assembly 102 is capable of motion along the X, Y, Z and $\theta_g$ directions while the probe card holder assembly (PCHA) 104 is held stationary. In another embodiment, the WHA 102 can be held stationary while the PCHA 104 is capable of motion. In yet another embodiment, the WHA 102 and PCHA 104 can both be capable of motion. In addition, the wafer 106 itself can be rotated around the $\theta_w$ direction relative to its holding chuck 108 in the wafer holder assembly 102. In this manner, the wafer 106 being supported by the wafer holder assembly 102 can be moved relative to the probe card pins 158 being supported by the probe-card holder assembly 104 so that the pins 158 can be brought in contact with conductive elements 110 such as pads or balls/bumps on the wafer 106.

The wafer holder assembly 102 is supported by a granite base 112 and a metal frame 114 which is located on a support surface 116. The wafer holder assembly 102 includes a motion system 118, a Z stage 120, and a holding chuck 108.

The holding chuck 108, in one embodiment, holds the wafer 106 to present a number of bond pads 110a for testing. The chuck 108, being movable in the X,Y,Z and $\theta_g$ directions 122, is connected to the Z-stage 120 of the gantry. The X-Y motion system 118, in one embodiment, can be an X-Y gantry system which allows an X stage 138 to move in the X-direction and a Y-stage 146 to move in a Y-direction. The X-Y motion system 118 is connected with a Z stage 120 which is capable of moving in the Z-direction 154 to allow the probe pins 158 to make contact with the pads 110a on the wafer 106. The X-Y motion system 118 is also connected with an encoder or sensors to track the position, velocity, and acceleration of the Z-stage 120 and wafer 106.

It is also appreciated, in another embodiment, that the Z stage 120 floats above a granite base having a series of evenly distributed air orifices which blow air upwards towards the Z stage 120 in order to help it move smoothly over the granite base 112 and thus alleviate some of the contact friction between the Z stage 120 and the granite base 112.

In another embodiment, the X-Y motion system 118 can also be a sawyer motor system having a smooth platen surface, a magnetized forcer, and driving coils which affect the magnetic flux of the forcer to move the Z stage 120 in an X or Y direction 140,150 over the surface of the platen. In the sawyer motor system, the platen is a non-porous surface so that air bearings mounted to the wafer holder assembly 102 can create a pressurized region between the wafer holder assembly 102 and the platen surface. Air bearings, such as orifice air bearings or porous media bearings, are attached to the lower surface of the Z-stage 120 to blow downward toward the platen thus creating a uniform air gap between the Z-stage 120 and platen.

FIG. 2 further shows a probe card holder assembly 104 which includes a support member or assembly 124, a ring carrier 126, a probe card 128, and probe tips 158. The ring carrier 126 is supported by the support assembly 124 and can be made of a metal such as aluminum or steel. The support assembly 124 is connected with the metal frame 114 which is connected with the granite base 112. In this embodiment, the probe card holder assembly 104 is stationary; however, it is possible to provide the probe card holder assembly 104 with a motion mechanism so that the probe card can move with respect to the wafer holder assembly 102.

The probe card 128 is connected with the probe tips 158 and presents the probe tips 158 for contact with the wafer 106. In this illustrative example, when the Z-stage 120 is actuated, the probe tips 158 come into contact with the conductive elements 110.

The system 100 may be moved on wheels, such as wheels 130 and 132. The wheels 130 and 132 are preferably part of a set of wheels, such as four wheels, although any number of wheels can be used. The wheels can be retracted so that the metal frame 114 and granite base 112 rests on the floor either directly on the floor or by retractable legs. In FIG. 2, the wheels 130 and 132 are in a retracted position although the wheels can be moved into an extended position so that the system 100 can be rolled across the support surface 116 making the system 100 portable.

Figure 3:
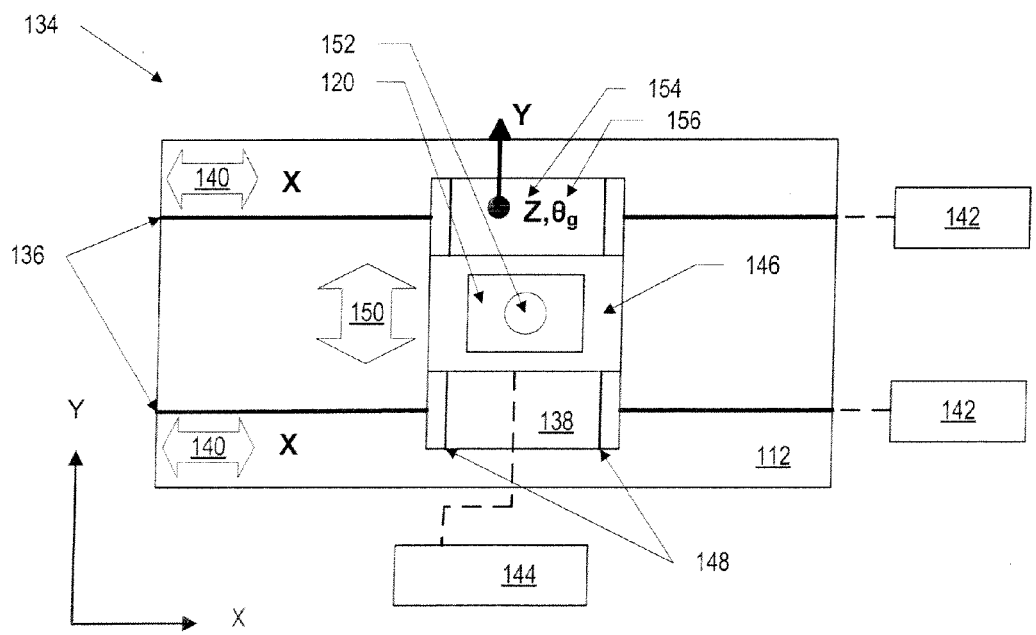
FIG. 3 illustrates a top view of a prober system.

FIG. 3 is a top view of the system 100 shown in FIG. 2. FIG. 3 illustrates an example where the X-Y motion system 118 is an X-Y gantry system 134, as briefly mentioned above. In the X-Y gantry system 134, a set of two X rails 136 allows the Z-stage 120 to move in a linear and low friction manner in the X-direction 140. The X rails 136 channel the motion of the Z-stage 120 so that a motion in the Y-direction is limited or non-existent. A bridge 138 (or X-stage) rests on top of the granite base 112 and X rails 136. The bridge 138 is connected with the Z-stage 120 and it is possible to have the Z-stage 120 be independently supported by air bearings or blow holes. The bridge 138 also is connected with the chuck 108 which holds the wafer 106 and its conductive elements 110. The chuck 108 is moved along the X direction 140 on the X rails 136 with respect to the granite base 112 by two X-motors 142 that are connected with the bridge 138. It is appreciated that the chuck 108 can be moved in the X-direction 140 by one X-motor, or any number of motors, instead of only two motors. An additional motion mechanism housed in the gantry system can move the chuck 108 in the Y, Z, and theta ($\theta$) directions.

FIG. 3, according to one embodiment, shows an X-Y gantry system 134 comprised of a Y-motor 144 connected with a Y-stage 146 that is connected with two Y-rails 148 that guide the Y-stage 146 in a Y-direction 150. The Z-stage 120 is supported or connected with the Y-stage 146 so that the chuck 108 and wafer 106 (not shown in this view) can also be moved in the Y-direction 150. The Y-motor 144 could be mounted within the X-Y motion system 118 or it could be remotely mounted and connected with the Y-stage 146 to enable the chuck 108 to be moved in the Y-direction 150.

FIG. 3 also shows, according to one embodiment, a brushless rotary motor 152 within the X-Y motion system 118 that is capable of raising the Z-stage 120 in a Z-direction 154 or theta ($\theta_g$) 156 direction. Depending on the specific use of the system, the rotary motor 152 can be replaced or used in combination with piezo-electric elevating mechanisms, linear motors, ball and screw arrangements, slider mechanisms that transfer a lateral force to a vertical force to drive the Z-stage 120 in the Z-direction 154, air bearings, or shape memory alloy material for moving the Z-stage 120 in the Z-direction 154. The rotary motor 152 is preferably mounted within the X-Y motion system 118; however, in another embodiment, the rotary motor 152 can be remotely mounted to drive the Z-stage 120 in the Z-direction 154 or theta 156 direction.

Figure 4:
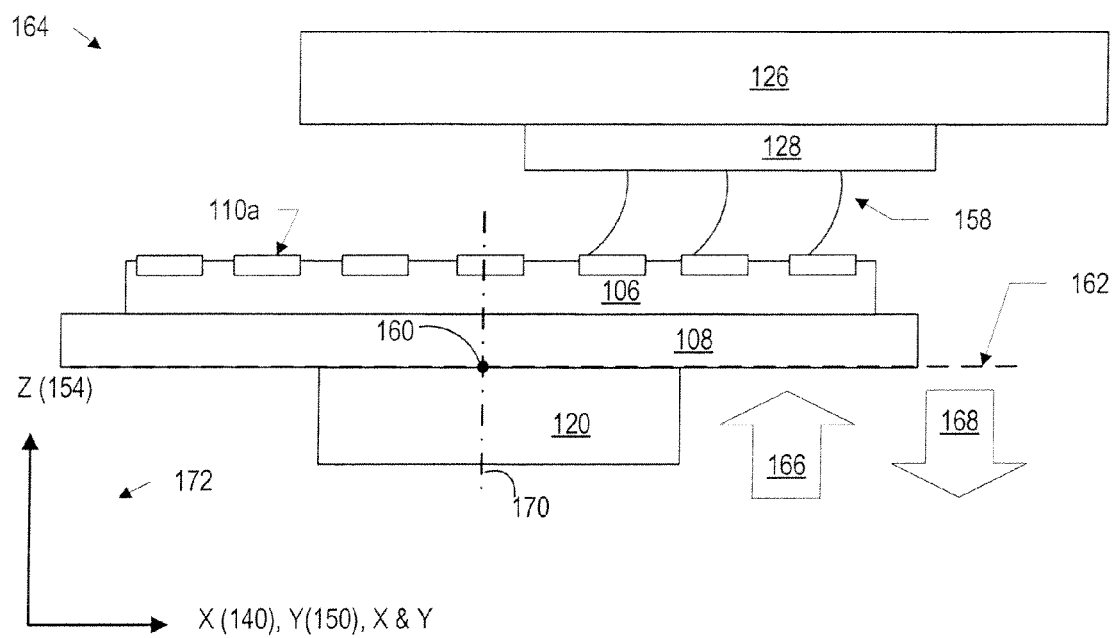
FIG. 4 illustrates a side view of a stage contact position between probe pins and conductive elements, according to one possible embodiment.

FIG. 4 shows a close-up side view of ring carrier 126, probe card 128 and probe pins 158 in contact with bond pads 110a so that the probe pins 158 create an electrical contact with the bond pads 110a. The Z-stage 120, holding chuck 108, and component or wafer 106 are located in a contact position 164. A Z-stage 120 first contact position height 162 is shown. A Z-stage 120 reference point 160 is located on a top portion of the Z-stage 120 and is directly aligned with the contact position height 162 when the component or wafer 106 is in contact with the probe pins 158. The Z-stage 120 reference point 160 is shown to be located at the topmost portion of the Z-stage 120, below the holding chuck 108 and wafer 106, and located along a central axis 170 of the Z-stage 120. It is appreciated that the Z-stage 120 reference point 160 is chosen in this location for the purposes of illustration and it is possible for another reference point location to be chosen in order to describe the same Z-stage 120 motion profile to be further described.

The Z-stage 120 can arrive at the first contact position height 162 by an upward movement in an upward or third direction 166 (or second vertical direction) of the Z-stage 120. After the probe pins 158 contact the component or wafer 106, the Z-stage 120 disengages the wafer 106 from the probe-card holder assembly 104 by moving in a downward or first direction 168 (or first vertical direction).

The two-dimensional coordinate system 172 shows the Z-direction 154 parallel with the central axis 170 of the Z-stage 120 and first and third directions 168, 166. The direction perpendicular to the Z-direction 154 can be either the X direction 140, Y-direction 150, or a combination of X and Y directions 140, 150.

Figure 5A:
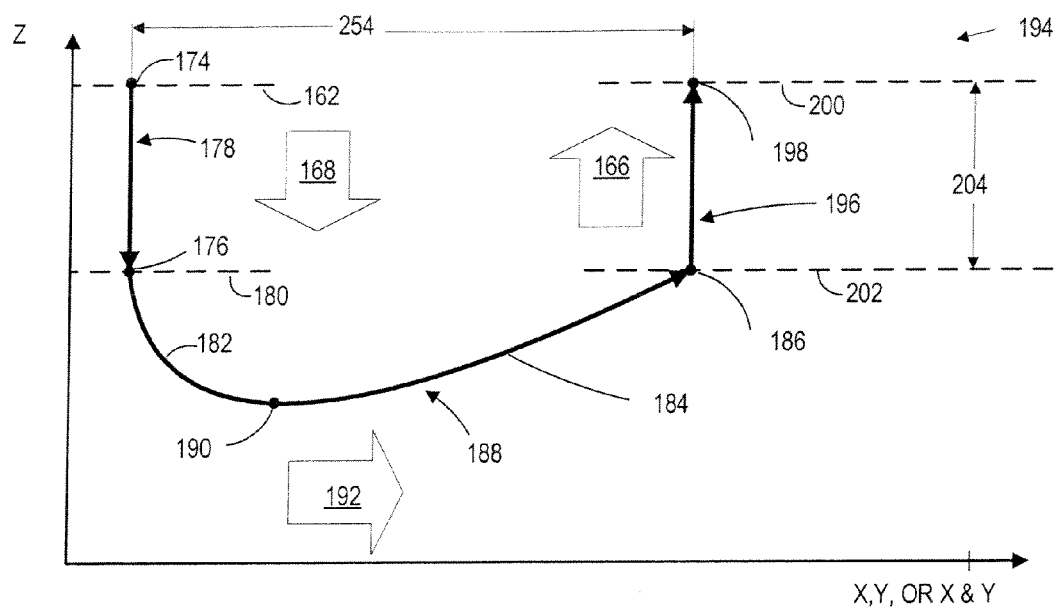
FIG. 5a illustrates a side view of a stage motion profile, according to one embodiment.

FIG. 5a shows a motion profile 194 traced by the Z-stage 120 reference point 160 as the Z-stage 120 moves through three distinct lines of motion. The Z-axis and X or Y-axis define a plane within which the Z-stage 120 motion is illustrated.

It is appreciated that the above Z-stage 120 motion could occur in a three-dimensional space, outside of the illustrated plane, but for ease of illustration the examples set forth occur in a two dimensional coordinate system.

The Z-axis extends in a positive Z-direction 154 while the axis perpendicular to the Z-axis extends in an X-direction 140, Y-direction 150, or both X and Y directions 140,150. The Z-stage reference point 160 begins at a first starting point 174. The first starting point 174 represents the Z-stage 120 when it is in the contact position 164 as shown in FIG. 4. The Z-stage 120 moves from the first starting point 174 toward a second point 176 by following a first motion profile 178 in the first direction 168. The first direction 168 can also be described as a motion in the negative Z-direction 154 or first vertical direction. The second point 176 is located within a plane defining a first clearance height 180.

In one embodiment of the invention, a clearance height 180,202 is a height at which movement in a direction perpendicular to the first direction 168 can safely be achieved without damage to any components within the system 100.

At the first clearance height 180, the Z-stage 120 can be moved laterally (with respect to the first direction) with zero risk of damaging the probe pins 158, conductive elements 110, wafer 106, holding chuck 108, probe card 128, ring carrier 126, Z-stage 120, or any component within the system 100.

After moving through the first clearance height 180, the Z-stage 120 follows a second motion profile 188 while moving toward a settle check point 186. The second motion profile 188 is a curved non-parabolic motion during stage 120 movement in the lateral direction. The settle check point 186 is a location where the Z-stage 120 will be allowed to settle in the second direction 192 to within a threshold value. In one embodiment, the Z-stage 120 only has one settle check point 186 between moving the stage 120 in the first vertical direction 168 (beyond the first clearance height 180) and moving the stage 120 to the second contact position 198.

The second motion profile 188 has two segments of motion. The first segment 182 occurs immediately after the Z-stage 120 passes through the first clearance height 180 at second point 176 and approaches a bottom point 190. The second segment 184 occurs between the bottom point 190 and the settle check point 186.

The bottom point 190 is the farthest distance in the first direction 168 the Z-stage 120 will travel throughout the entire motion profile 194. In the entire motion profile 194, the bottom point 190 occurs at a location that is non-equidistant between the second point 176 and the settle check point 186 along the second direction 192 that is perpendicular to the first direction 168.

During the first segment 182, the Z-stage 120 begins to move in a second direction 192 simultaneously with the first direction 168. The second direction 192 can be in a positive X-direction 140 or Y-direction 150 with respect to the coordinate system shown. After passing the bottom point 190, the Z stage begins to move along the second segment 184 toward the settle check point 186. The settle check point 186 is located at a second clearance height 202. The second clearance height 202 can be the same height as the first clearance height 180 or can be different depending on system factors such as wafer 106 planarity, probe pin sizes, materials, bond pads, or any other relevant variable within the system 100. In one embodiment, the second clearance height 202 can have up to a 20 micron difference when compared with the first clearance height 180.

Figure 5B:
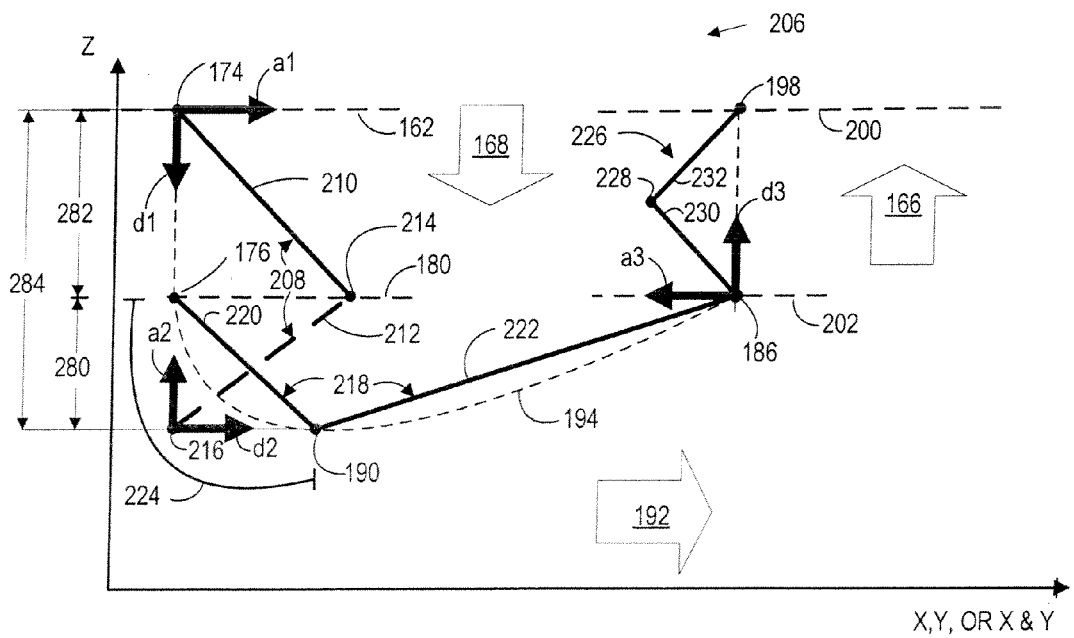
FIG. 5b illustrates a side view of a stage acceleration profile, according to one embodiment.

In FIGS. 5a and 5b, the second clearance height 202 is shown as being the exact same value as the first clearance height 180 for ease of discussion.

During motion in the second segment 184, the Z-stage 120 moves in a third direction 166 simultaneously with the second direction 192. It is also possible that the second segment 184 can consist of a movement in the third direction 166 simultaneously with another direction other than the second direction 192 (being in a different plane). It should be noted that the first direction 168 is perpendicular to the second direction 192 and is parallel and opposite to the third direction 166.

After reaching the settle check point 186, the Z-stage 120 moves in purely the third direction 166 along a third motion profile 196 to approach a second contact position 198 located at a second contact position height 200. The second contact position height 200 may be the same height as the first contact position height 162 or it may be a substantially different height depending on the previously mentioned system factors such as wafer 106 planarity, probe pin sizes, materials, bond pads, or any other relevant variable within the system 100. Again, the second contact position height 200 is shown as being the same height as the first contact position height 162 for ease of discussion.

As mentioned, the Z-stage 120 will travel a distance along the third motion profile 196. The distance traveled by the third motion profile 196 is defined by the clearance gap distance 204 within which a Z-stage 120 must be isolated from lateral movement. If lateral movement of the Z-stage 120 occurs while the Z-stage 120 is within the clearance gap distance 204, the risk of damaging the system 100 components is present.

The clearance gap distance 204 defines the distance between the clearance heights 180,202 and the contact position heights 162, 200. In one embodiment, the clearance gap distance 204 can be within the range of at least 125 microns ($\mu$). In another embodiment, the clearance gap distance 204 is within the range of 125$\mu$-1 mm. Of course, the clearance distance 204 could be up to several millimeters depending on system 100 components and control parameters.

FIG. 5a shows a die step size 254 which defines the distance between the first and second contact positions 174, 198. The die step size 254 has a midpoint which has a distance value of half the step size. The Z-stage 120 reaches a bottom point 190 before reaching the midpoint between the two contact positions 174, 198.

In one example, according to one embodiment, the Z-stage 120 travels along a first motion profile 178 through a distance of 0.330 mm. The clearance gap distance 204 in this example is also 0.330 mm. During the second motion profile 188, the Z-stage 120 moves in the second direction 192 a die step size 254 of 6.5 mm in-between the second point 176 and settle check point 186. The Z-stage 120 then moves upward in the third direction 166 a distance of 0.330 mm to the second contact position 198 along the third motion profile 196. Furthermore, in this example, the distance in the first direction 168 (or negative Z-direction) between the second point 176 and the bottom point 190 is about 0.15 mm-0.165 mm in a turn around period 224 later described. Therefore, the total travel distance of the Z-stage 120 in the first direction is about 0.480-0.495 mm.

According to the embodiment described, the travel distance of the first motion profile 178 in the first direction 168 and the third motion profile 196 in the third direction 166 are both equal to the clearance distance 204 to avoid damage to system 100 components.

According to another embodiment, it would be possible to have the first motion profile 178 and second motion profile 196 each greater in length than the gap distance 204; however, such a system would increase the total travel distance of the Z-stage 120 thereby decreasing the efficiency of the movement of the stage 120.

FIG. 5b shows an acceleration profile 206 of the motion profile 194 described in FIG. 5a. The motion profile 194 of FIG. 5a is generally shown by a dotted line in FIG. 5b for reference. The first acceleration profile 208 is described with reference to first acceleration axis a1 and first distance axis d1. According to this exemplary embodiment, the first acceleration axis a1 is perpendicular to the first direction 168 and increases in a positive X-direction 140, Y-direction 150, or X and Y direction. The first distance axis d1 is parallel with the first direction 168 and increases in a negative Z-direction 154.

The first acceleration profile 208 has two segments 210, 212 which describe the acceleration behavior of the motion profile 194 in the first direction 168. The Z-stage 120 begins at zero acceleration at first starting point 174. As the Z-stage 120 moves in the first direction 168 it accelerates toward the second point 176 at an increasing constant acceleration exemplified by acceleration segment 210.

When the Z-stage 120 reaches the second point 176, the Z-stage is accelerating at a peak acceleration 214 at the first clearance height 180. In one embodiment, the acceleration and deceleration in the first direction 168 is approximately 0.7 g (0.3 g-1 g).

It is appreciated that the acceleration of the Z-stage 120 should be as high as possible being limited by system abilities. For example, changes in amplifiers, number of amps, power supply, size of the system, stage inertia, and other system 100 component parameters will affect the ability of the Z-stage 120 to accelerate at specific rates. The acceleration can be increased or decreased by changing certain system 100 variables. For example, a smaller stage size with less inertia during movement may achieve faster indexing times and acceleration than systems with a larger stage size.

Maintaining a maximum acceleration and deceleration value throughout the stage movement is critical in taking advantage of the efficient motion profile 194 described.

After passing the second point 176, the Z-stage 120 begins to decelerate in the first direction 168 with respect to the acceleration axis a1 and distance axis d1, as exemplified by the deceleration segment 212 (shown as a dotted line for clarity). The Z-stage 120 decelerates in the first direction 168 until it reaches bottom point 190 when movement in the first direction 68 is completed and acceleration in the first direction 168 decreases to zero 216.

As the Z-stage 120 is decelerating in the first direction 168 after passing the first clearance height 180, a deceleration also occurs in the second direction 192. The second acceleration profile 218 is described with reference to second acceleration axis a2 and second distance axis d2. According to this exemplary embodiment, the second acceleration axis a2 is perpendicular to the second direction 192 and parallel to the first direction 168. The second acceleration axis a2 increases in a positive Z-direction 154. The second distance axis d2 is perpendicular with the first direction 168 and parallel with the second direction 192. The second distance axis d2 is increasing in a positive X-direction 140, Y-direction 150, or both X and Y directions 140, 150.

FIG. 5b further shows the second acceleration profile 218 having two segments 220, 222 which describe the acceleration behavior of the motion profile 194 in the second direction 192. The deceleration segment 220 is related directly to the first motion segment 182 (of the second motion profile 188) previously described. On the same token, the acceleration segment 222 is related directly to the second motion segment 184 shown in FIG. 5a.

As the Z-stage 120 moves in the second direction 192 simultaneously with the first direction 168, the Z-stage 120 decelerates from the second point 176 to the bottom point 190 in both first and second directions 168, 192. In one embodiment, the Z-stage 120 may experience an acceleration in the second direction 192 simultaneously with the deceleration in the first direction 168. In one embodiment, the acceleration and deceleration value of the Z-stage 120 in the second direction 192 is approximately 0.7 g (0.3 g-1 g). As previously described, acceleration values can be affected by many system 100 variables.

Because there is deceleration in the first 168 direction, this region can be referred to as a turn around period 224, being closely related to the Z-stage 120 motion in the first segment 182 of the second motion profile 188.

In the previously described example, the distance in the first direction 168 (or negative Z-direction) between the second point 176 and the bottom point 190 was about 0.15 mm-0.165 mm in a turn around period 224 and the Z-stage 120 traveled along a first motion profile 178 through a distance of 0.330 mm. The distance between the second point 176 and the bottom point 190 also represents the distance that the Z-stage 120 travels in the first direction during the turn around period 224. The turn around period 224 is where the lateral movement in the second direction 192 begins and Z-stage 120 deceleration begins to occur laterally as well as vertically.

The Z-stage 120 accelerates through the first clearance height 180 and has a deceleration distance 280 of about one-third of the total vertical travel distance 284 of the Z-stage 120 in the first direction 168 (0.165 mm/0.495 mm=0.33). The deceleration distance 280 in the first direction 168 (below the clearance height 180) is at most one-half of an acceleration distance 282 that occurs above the clearance height 180. In other words, the deceleration distance 280 is at most one-half of the acceleration distance 282 of the stage in the first direction 168.

In one embodiment, the deceleration distance 280 in the first direction 168 is at most one-half of the clearance gap distance 204 (if clearance gap distance 204 and acceleration distance 282 are equal).

FIG. 5b shows the deceleration segment 220 with respect to acceleration axis a2 and distance axis d2. The deceleration segment 220 represents the Z-stage 120 decelerating in the second direction 192 until it reaches the bottom point 190. At bottom point 190, the deceleration in the first direction 168 reaches a zero value 216, according to the deceleration segment 212. Simultaneously, at bottom point 190, the deceleration in the second direction 192 also reaches a zero value according to deceleration segment 220. Bottom point 190 also represents the point at which acceleration or deceleration in the first direction is complete.

After bottom point 190, a Z-stage 120 acceleration begins to occur in the second direction 192 as represented by acceleration segment 222. In one embodiment, it is understood that it may be possible for the Z-stage 120 to accelerate in the second direction 192 before reaching bottom point 190. During the acceleration segment 222, there is also an acceleration (not shown) occurring in the third direction 166. According to one embodiment, the acceleration 222 continues in the second 192 and third 166 directions (or laterally and vertically) until the stage reaches settle check point 186.

At settle check point 186, the control system 250 (later described in detail) determines whether movement in the X and Y directions 140, 150 have been reduced to a threshold value, such as zero. As previously described, any lateral movement (or movement perpendicular to the third direction 166) of the Z-stage 120 when it is past the second clearance height 202, within the clearance gap distance 204, could cause potential damage to the system 100. The settle check point 186 is a location where the control system 250 ensures no damage will result from unwanted lateral movement. The settle check time required to ensure zero or minimal lateral movement of the Z-stage 120 at settle check can be as fast as 20 msec or can take as long as a few seconds.

In one embodiment, the settle check time is minimal and does not significantly hinder the movement of the Z-stage 120 so that acceleration in the second direction 192 can occur constantly toward the settle check point 186, as exemplified by acceleration segment 222.

In another embodiment, the settle check time may be significant and thus can require the Z-stage 120 to decelerate in all directions to a stopping point in order to allow lateral movement to be isolated.

FIG. 5b also shows a third acceleration profile 226, where the Z-stage 120 accelerates to a midpoint 228 during acceleration segment 230. The Z-stage 120 then decelerates, during deceleration segment 232, to the second contact position 198. In one embodiment, the acceleration and deceleration in the third direction 166 is approximately 0.7 g (0.3 g-1 g). Again, acceleration values are affected by many system 100 variables.

FIGS. 6a-6d show the movement of the Z-stage 120 and its interaction with the probe needles 158 during the entire motion profile 194 described in FIGS. 5a and 5b except that the Z-stage 120 central axis 170 is oriented in a horizontal direction for side probing. FIGS. 6a-6d emphasizes side probing and the fact that the Z-stage 120 does not need to be oriented in a vertical direction with respect to a support surface or base. The reference point 160 in FIGS. 6a-6d follows the motion profile 194 as mentioned.

Figure 6A:
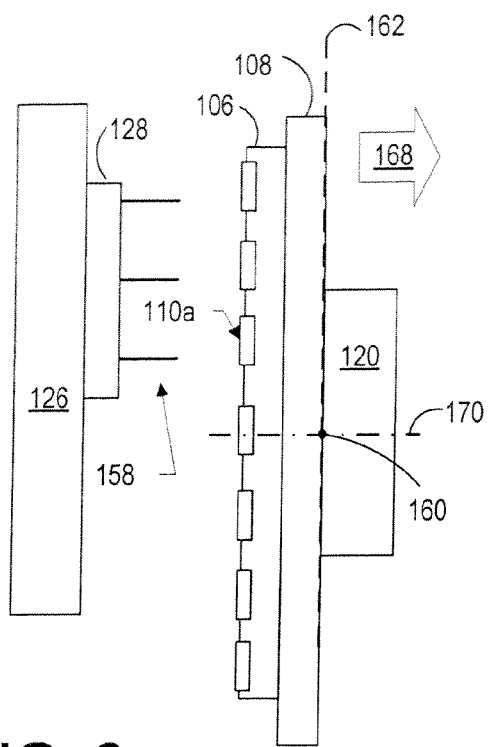
FIG. 6a illustrates a side view of a stage in a horizontal probing operation, according to another embodiment.
Figure 6B:
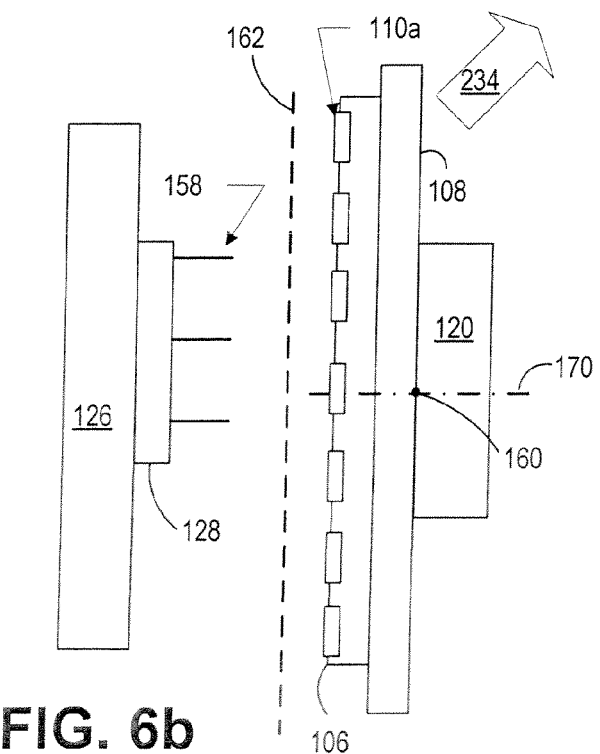
FIG. 6b illustrates another side view of a stage in a horizontal probing operation, according to another embodiment.
Figure 6C:
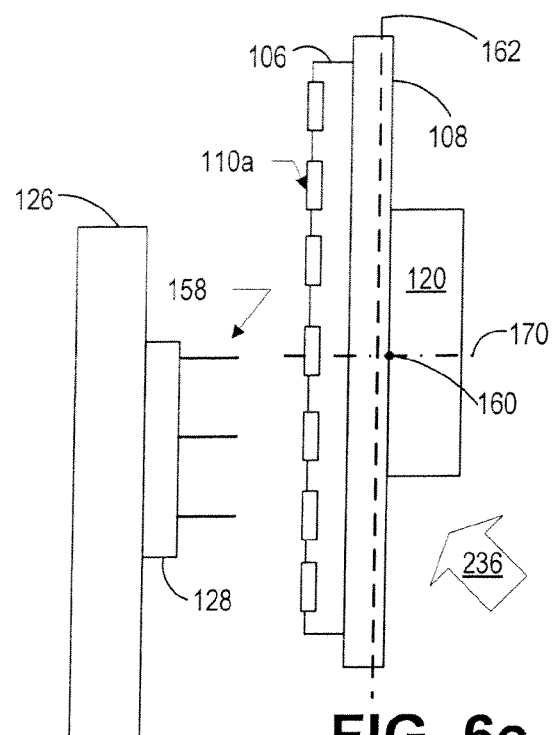
FIG. 6c illustrates another side view of a stage in a horizontal probing operation, according to another embodiment.
Figure 6D:
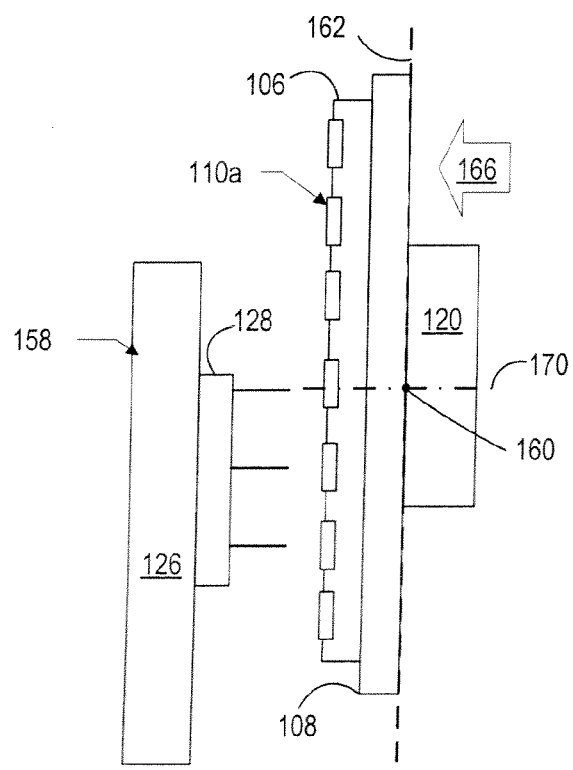
FIG. 6d illustrates another side view of a stage in a horizontal probing operation, according to another embodiment.

FIG. 6a shows the Z-stage 120 moving in the first direction 168 along the first motion profile 178. FIG. 6b shows the Z-stage 120 moving along the second motion profile 188, 182 in a first direction 168 and second direction 192, as generally indicated by an arrow 234. FIG. 6c shows the Z-stage 120 moving in a third direction 166 and second direction 192 generally indicated by an arrow 236 after having passed the bottom point 190. FIG. 6d shows the Z-stage 120 moving in the third direction 166 to the second contact position 198 where the Z-stage 120 allows the probe pins 158 to contact the bond pads 110a in another location on the wafer 106.

Figure 7A:
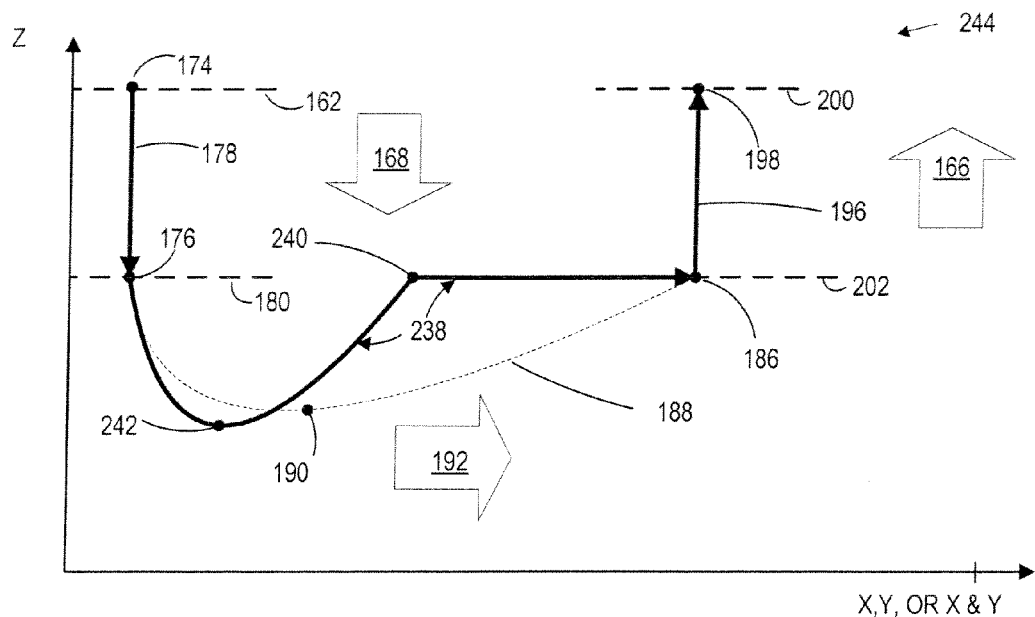
FIG. 7a illustrates a side view of a stage motion profile, according to another embodiment.

FIG. 7a shows another embodiment related to a motion profile 244 having an alternative second motion profile 238. In this embodiment, the first and third motion profiles 178, 196 are similar to those described in FIG. 5a. However, there is an alternative second motion profile 238 where the Z-stage 120 decelerates to an alternative bottom point 242 and then accelerates to a check point 240. The check point 240 can be used for many different uses. For example, an inspection process can be implemented at check point 240 or the control system 250 can check whether vertical motion is complete before proceeding. The check point 240 can be a pause in the Z-stage 120 motion 244 or can be a relatively fluid motion allowing the Z-stage 120 to constantly accelerate in the second direction 192 to reach the settle check point 186.

After the check point 240, the Z-stage 120 then moves in the second direction 192 toward the settle check point 186. The second motion profile 188 of FIG. 5a is shown in a dotted line for discussion and reference. The alternative bottom point 242 occurs slightly earlier in the second direction than the bottom point 190 of motion profile 188.

Figure 7B:
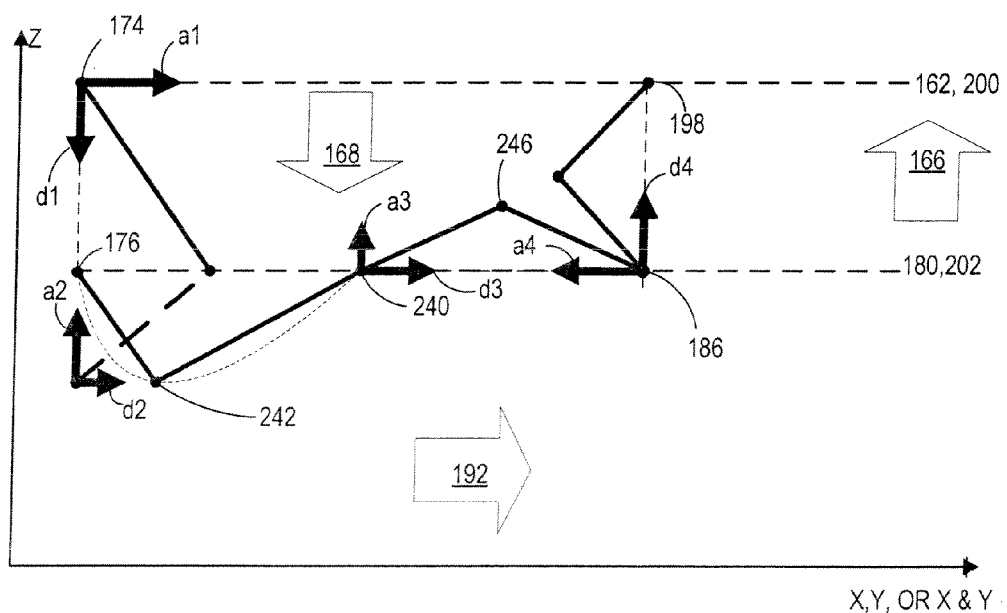
FIG. 7b illustrates a side view of a stage acceleration profile, according to another embodiment.

FIG. 7b illustrates the acceleration profile of the motion profile 244 shown in FIG. 7a. During the alternative second motion profile 238, the Z-stage 120 accelerates from the bottom point 242 to the check point 240. The Z-stage 120 can continue to accelerate after the check point 240 in the second direction 192. The Z-stage 120 acceleration in the second direction 192 is then described by reference to acceleration axis a3 and distance axis d3. The Z-stage 120 continues to accelerate primarily in the second direction until a midpoint 246 at which the Z-stage 120 begins to decelerate to arrive at the settle check point 186. Again, the check point 240 can also be a location where the Z-stage 120 pauses for a time period before proceeding, in which case a deceleration in the second direction 192 would be required.

Figure 8:
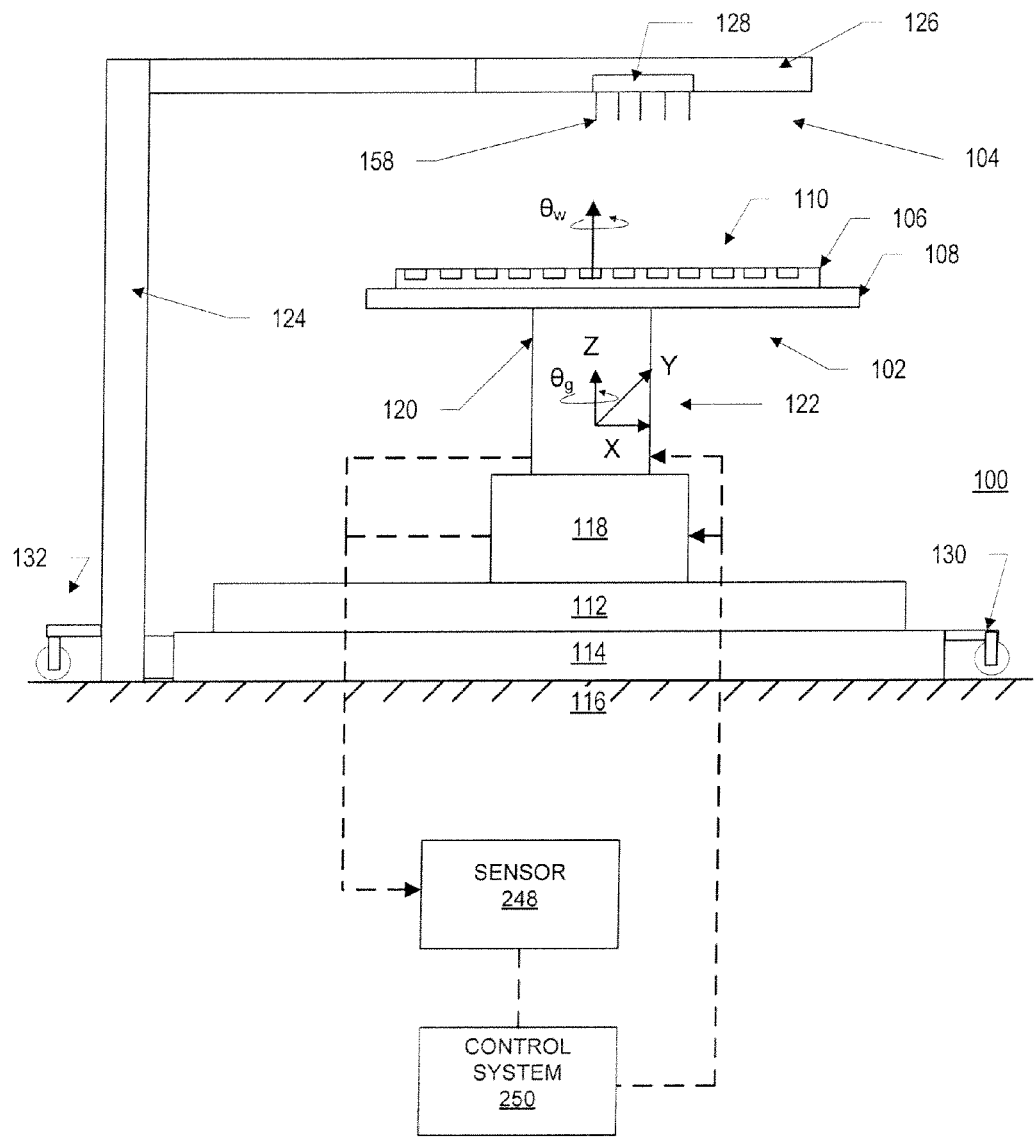
FIG. 8 illustrates a side view of a possible embodiment of a prober testing system and its two main stages connected with a control system.

FIG. 8 shows the system 100 and its connections with a sensor 248 and control system 250. Specifically, a sensor 248 is in communication with or connected with motion system 118 and Z-stage 120 so that a parameter of the Z-stage 120 is accurately known at all times. The parameter measured by the sensor 248 can be a position, velocity, or acceleration of the Z-stage 120. The sensor 248 relays information to the control system 250 so that precise motion control commands can be communicated to the mechanisms that move the Z-stage 120, such as motors 142, 144. The sensor 248 can be any type of sensor such as an encoder, camera system, or any known motion control sensor.

In one embodiment, the control system 250 is a model based control system that can predict motion profiles, trajectories, and settle times as further described in detail.

Figure 9:
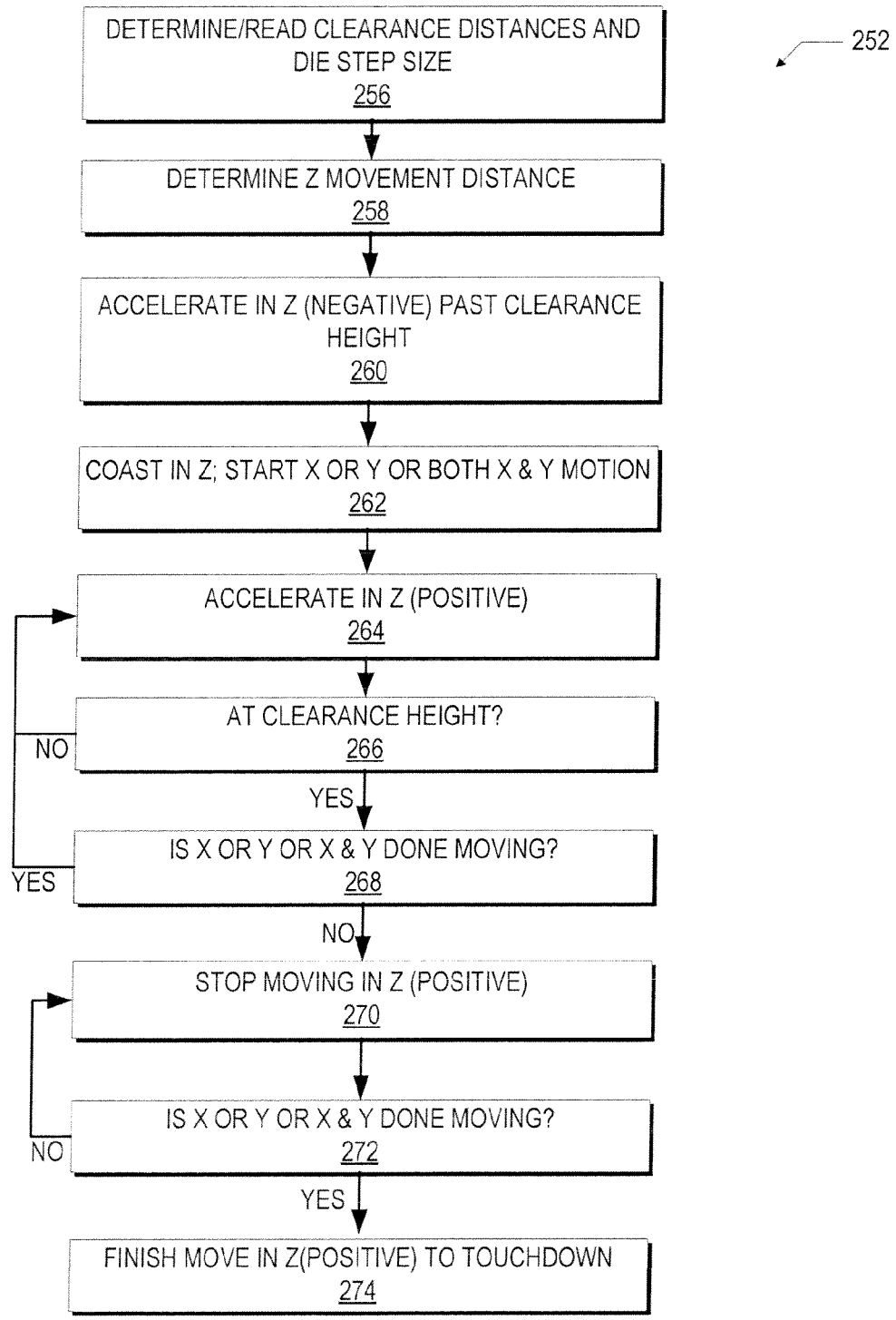
FIG. 9 illustrates a flow diagram showing exemplary operations of a stage control process.

FIG. 9 illustrates a flow chart describing a control process 252 of the control system 250. The control process 252 begins by determining 256 or reading the clearance distance 204 and die step size 254. The clearance distance 204 and die step size 254 can be input parameters (input automatically by a system or manually by a user) being dependent on various parameters of the system 100, such as what type of wafer 106, component, or probe pins 158 are being used. Also, a starting location on the wafer 106 should be determined for the probe pins 158 to make contact with the wafer 106. From the clearance distance 204, a first clearance height 180 and second clearance height 202 can be calculated for the Z-stage 120.

The control process 252 also determines 258 the Z-movement distance for accelerating in the negative Z-direction 154 (such as first direction 168). The control process 252 proceeds to accelerate 260 the stage in the negative Z-direction 154 past a clearance height.

Upon passing the clearance height, the Z-stage 120 begins to coast 262 in the negative Z-direction 154 causing a deceleration while simultaneously beginning a motion in the X-direction 140, Y-direction 150, or both X and Y directions 140, 150. The coasting 262 effect can be accomplished by adjusting a motor parameter, such as current, to cause the motor to decelerate. By applying a current in the opposite direction, the motors can decelerate as quickly as they accelerated. Coasting can also be achieved by shutting off the Z-direction 154 motor until the Z-stage 120 decelerates to zero at a bottom point.

FIG. 9 further shows a step and repeat process. The Z-stage 120 accelerates 264 in a positive Z-direction 154 after reaching a bottom point. The control process 252 constantly monitors 266 whether the Z-stage 120 has reached the second clearance height 202 or a settle check point. If the second clearance height 202 is not reached, the Z-stage 120 continues to accelerate in the positive Z-direction 154. If the second clearance height 202 is reached, the control process 252 checks 268 whether there is movement in the X-direction 140 or Y-direction 150 and whether that movement is below a threshold value.

In one embodiment, the control process checks 268 whether X or Y movement is done by monitoring the sensor 248. The sensor 248, which can be a plurality of sensors or just one sensor, is connected with or monitors the motion system 118 which can be an X-Y gantry system 134 shown in FIG. 3.

According to one embodiment, in the X-Y gantry system 134, the sensor 248 monitors whether the movement in the X-stage 138 and/or Y-stage 146 has stopped or dropped below a threshold value (safety check). If no movement is detected in the X and Y stages 138, 146 but the second clearance height 202 has not been reached yet, then the Z-stage 120 will continue to accelerate in the Z-direction 154 until the second clearance height 202 is reached.

In FIG. 9, if the Z-stage 120 is located at the second clearance height 202 but motion in the X and/or Y directions 140,150 is still present in the system 100, the Z-stage 120 will stop moving 270 in the positive Z-direction 154 to prevent X-Y motion from occurring above the second clearance height 202. The control process 252 continues to check 272 whether the motion in the X and/or Y directions is present. If the X-Y motion continues, the Z-stage 120 will be maintained at the clearance height until such X-Y motion is finished. After the X-Y motion is finished and the Z-stage 120 is located at the second clearance height 202, the Z-stage 120 will finish moving 274 in positive Z-direction 154 to a commanded touchdown position where testing will begin on the wafer 106.

According to another embodiment, trajectory calculations are made at every motion profile or movement, to minimize motion times by optimizing acceleration times and distances, while maintaining wafer 106 and probe card 126 safety. This update to the motion profile happens every 50 microseconds.

By incorporating a high update rate, safety checks can occur in conjunction with a stage movement rather than after the completion of the move. By using a model based control, the settle time (t*—the time at which the X-Y motion will have settled to within a specified tolerance) can be predicted. The Z-component of the trajectory can thereby be planned (timed) so that the wafer doesn't come into contact with the probe pins 158 until after the X-Y motion has sufficiently settled. Conversely, the X-Y trajectory for the die-step can be planned (timed) to start when the Z-trajectory or motion profile displaces the wafer safely out of contact with the probe pins. Thus, the present invention speeds the time to step from one die to the next but accomplishes this with a deterministic lift-off and touchdown trajectory.

Figure 10:
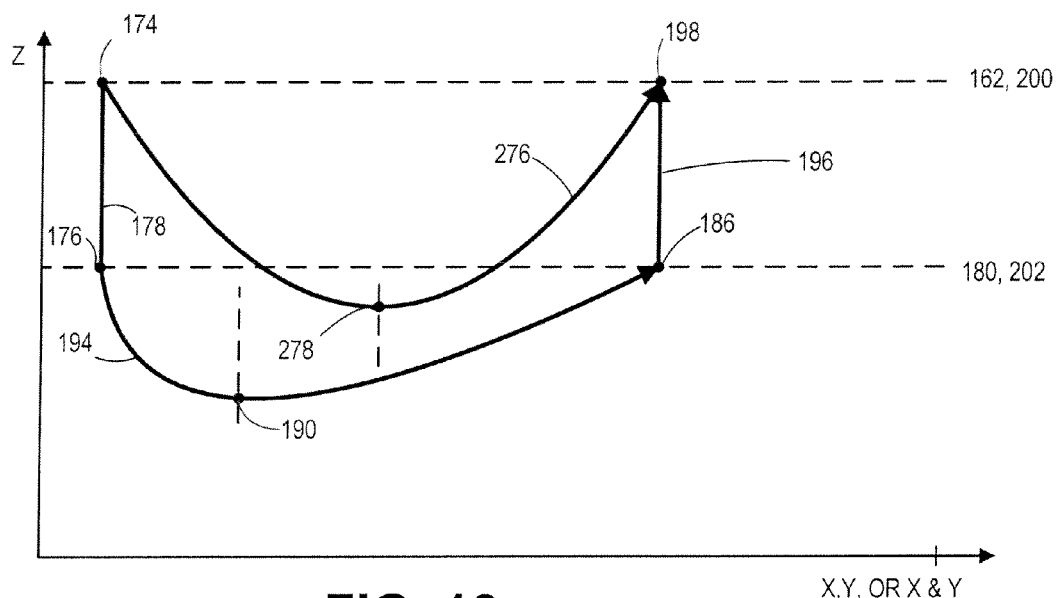
FIG. 10 illustrates a side view of a stage motion profile in comparison to a parabolic motion profile.

FIG. 10 shows the non-parabolic motion profile 194 of FIG. 5a in comparison with a parabolic shaped motion profile 276 with midpoint 278. The present invention has significant advantages over a parabolic shaped motion profile 276. The parabolic shaped motion profile 276 shows lateral movement before reaching a clearance height and has a substantial risk of damaging components. Furthermore, the parabolic shaped motion profile 276 may be shorter in travel distance than motion profile 276, but the parabolic motion profile 276 will move slower than the motion profile 194. Thus, the parabolic profile 276 will have a longer "index time". Even though the motion profile 194 travels a longer distance than parabolic profile 276, the present invention spends more time accelerating than decelerating. The motion profile 194 begins acceleration in the second direction 192 at bottom point 190 whereas the parabolic profile 276 begins acceleration at a later midpoint 278. As a result, the motion profile 194 is more effective and efficient by having a shorter index time and longer acceleration times.

The acceleration of the Z-stage 120 in a the first vertical direction 168 through the first clearance height 180 occurs during a first time period greater than a second time period when the Z-stage 120 is decelerating after passing through the clearance height 180.

Figure 1A:
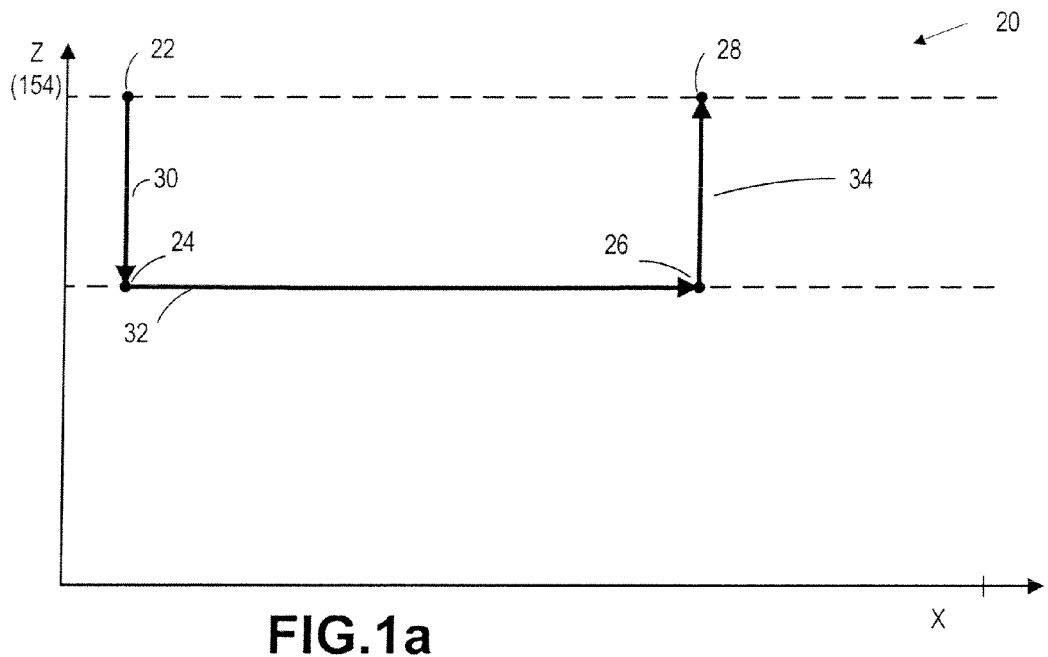
FIG. 1a shows a side view of a prior art motion profile of a stage.
Figure 1B:
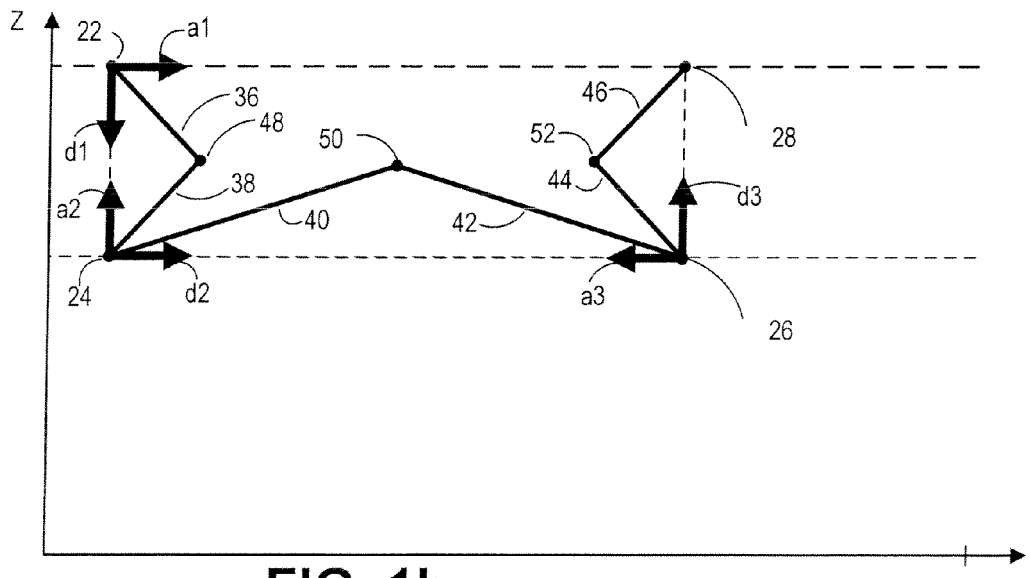
FIG. 1b shows a side view of a prior art acceleration profile of a stage.

The present invention has an important advantage over the prior art shown FIGS. 1a and 1b in that the "index time" for a Z-stage 120 to move from one contact position to another contact position is greatly reduced. In the scenario where the Z-stage 120 moves 6.5 mm (step size 254) in the second direction between two contact positions, the present invention would complete the entire movement in 230-242 msec. In contrast, the prior art described in FIGS. 1a and 1b would complete the movement in about 319 msec. The present invention achieves a decrease in index time between contact positions of about 24-30% over the prior art.

In one embodiment, the settling time of the present invention can be as fast as 20 msec whereas the settling time of the prior art will take at least as long as 40 msec or greater. The present invention significantly reduces settling time for a stage.

In one embodiment, the settling time can be planned or predicted by model based control as previously described. Empirical data can be used to predict a settle time or motion trajectory based on factors such as prior stage movements, the type of components being tested, amplifiers, number of amps, power supply, size of the system, stage inertia, and other system component parameters Moreover, the acceleration profile described in the present invention achieves a Z-motion having about two-thirds acceleration and one-third deceleration in the Z-direction 154. The known prior art has a Z-motion having only one-half acceleration and one-half deceleration in the Z-direction 154. The present invention may move farther in the Z-direction 154 than the prior art but spends less time moving in the Z-direction 154.

Another advantage of the present invention is that deceleration time in the Z-direction is decreased and acceleration time in the Z-direction is increased by accelerating the stage full speed past the minimum clearance distance. Deceleration occurs in the lateral movement which reduces indexing time. The present invention reduces waiting time and therefore increases efficiency and production abilities.

The stage control process 252 and methods described can be implemented in "direct write" operations such as ink jet, nozzle dispensing processes, aerosol spray coating, soft lithography, laser guidance approaches, AFM dip-pen techniques, or any technique or process capable of depositing, dispensing, or processing different types of materials over various surfaces following a preset pattern or layout. The control process 252 can quickly and efficiently move a stage holding a manufacturing component within the described processes. The control process 252 can be applied to fabrication systems for electronic devices, sensors, MEMS devices, and other known devices.

The control process 252 and methods described can be used with systems handling a broad range of materials such as all types of glass and metal, alloys, semiconductors, crystals, synthetic materials, ceramics, plastics, and natural organic materials including biological material.

The control process 252 and methods described can be used in an inspection stage system instead of a wafer probing system. In an inspection stage system, the contact positions 174, 198 would be considered inspection positions where a wafer, electronic device, or component is examined or imaged for defects. The stage 120 movement in the inspection stage system would apply the same methods and principles already discussed.

In a typical system the connections joining the different components are likely to exhibit flexibilities. Because the connections between components are not perfectly rigid there will be vibrationary or flexural relative displacements between the components of the system when a part of the system is exposed to a disturbance. The flexural deflections may in turn cause non-compensatory dislocations between the wafer pad and the probe card pins, thus degrading performance.

Figure 11:
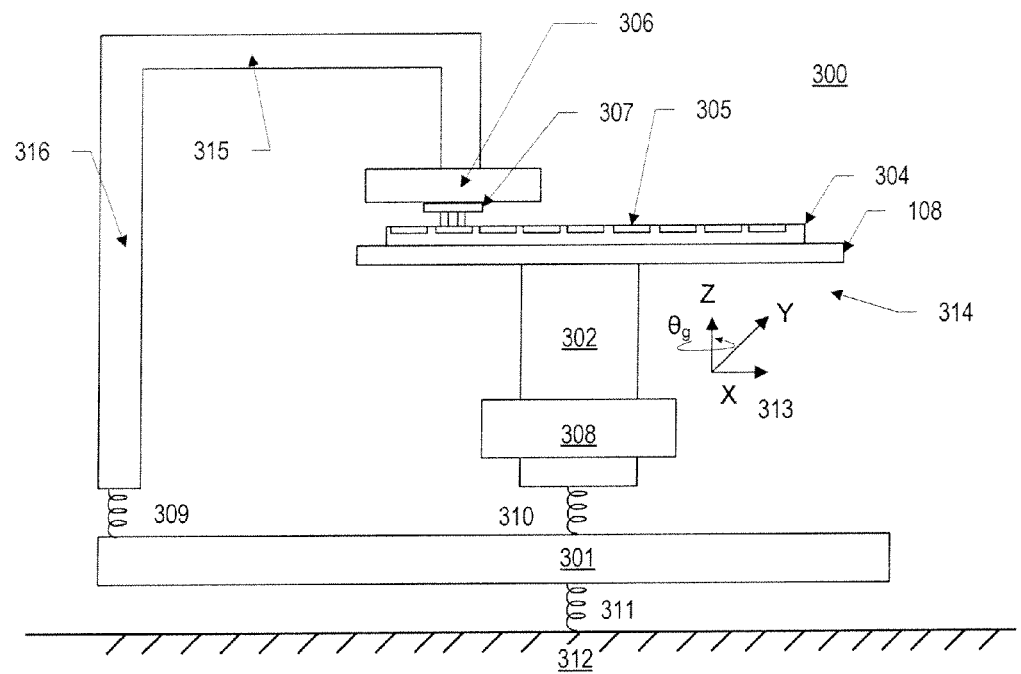
FIG. 11 illustrates a side view of a possible embodiment of a prober testing system with added flexibilities between various components.

FIG. 11 depicts a possible embodiment of a probing system 300 presenting flexural connections between some of the various components. A number of exemplary non-rigid connections between some of the components are shown in FIG. 11. Thus, the joint 310 between the Z stage 302 and the granite base 301 is illustrated with a spring symbol 310 to indicate the flexural (and vibratory) nature of the joint. The actuation system 308 is connected to the gantry system. Similarly, the connection 309 between the Probe-card Holder Assembly (PHA) stage 315, 316 and the granite base 301 of the Wafer Holder Assembly (WHA) stage 314 as well as the joint 311 between the granite base 301 and the floor 312 are also illustrated with spring symbols. It will be understood that actual physical springs are not present but that the joints may be modeled or represented by these springs. The coordinate system 313 is illustrated for clarity. A probe card holder chuck 306 maintains a probe card 307 against the bond pads 305 on a wafer 304.

Unwanted relative displacements can be reduced by increasing the flexural rigidity of the connections, or by providing isolation between the floor and the system. These methods have the disadvantage of requiring an increase in the weight of the system (thereby raising the sensitivity in the frequency domain to motion disturbances), and of requiring a change in the isolation properties at installation of a probing system. A less costly and complex solution that would reduce the effect of unwanted vibrations is to actively suppress or compensate for the motion disturbances via a sensing and control system.

In a possible embodiment of another aspect of the invention, disturbance measurement devices can be added to several locations on the probing system. For example, one sensor could be placed on the granite base, another on the XYZ motion mechanism on the gantry system and a third on the probe pin locating interface. Disturbance amplitude and phase information is measured continuously at all three locations and along different directions (X, Y and Z). The sensing information could be input into the motion controller through low pass filters to eliminate high-frequency noise in the signals. The controller would then process the relative amplitude and phase information to apply compensatory corrections to the system in the X,Y,Z or theta directions through the motion mechanism's existing actuation drives. The resultant motion is devoid of all uncontrolled relative displacements between the wafer substrate and the probe pins. In addition, the corrections would allow the system to step from die to die on the wafer much faster because the accelerometers would also be used to cancel out the reaction forces (internal disturbances) as the wafer chuck moves from probing one die to a position to probe the next die.

Figure 12:
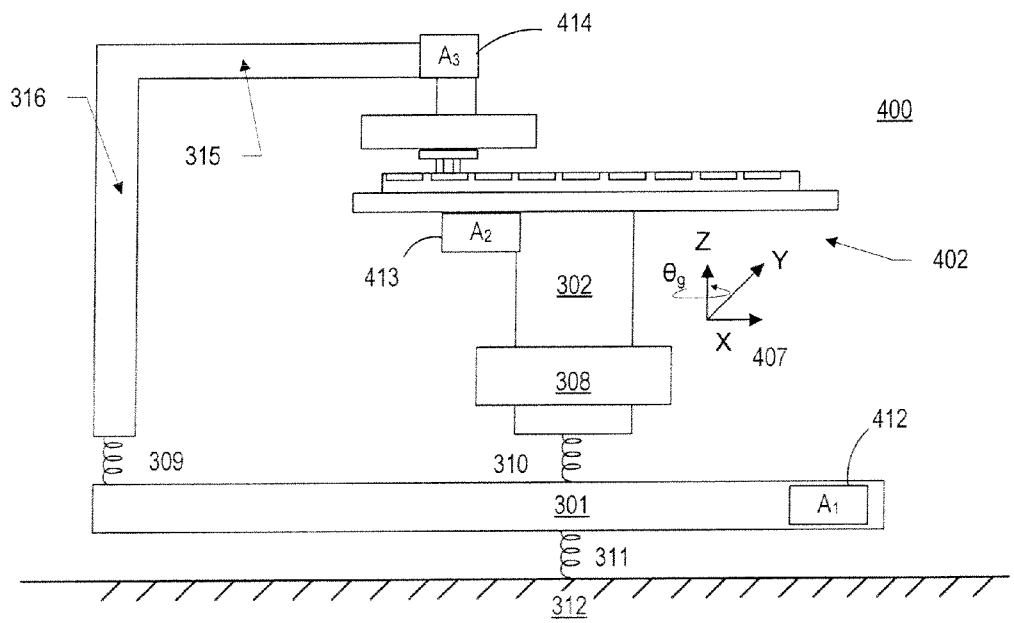
FIG. 12 illustrates an embodiment of acceleration sensing in a prober testing system with flexible connections.

FIG. 12 shows the same side view of the exemplary probing system presented in FIG. 11 with the addition of accelerometers at three different locations on the system. The boxes $A_1$ 412, $A_2$ 413 and $A_3$ 414 represent three accelerometers added to measure the motion of the granite base 301, the bridge/chuck/wafer assembly 402 (which can be assumed to be rigidly connected and thus considered as a single vibratory element) and the PCHA stage 315, respectively. The coordinate system 407 is shown for clarity.

The addition of these three sensors allows quantification of the magnitude and phase of the vibratory accelerations and/or velocities induced at each of these three locations by an external or internal disturbance. Similarly, the measurements can be used to derive the relative acceleration, velocity, magnitude and phase between the measured components. Both types of measurement, individual and relative, can be used in different control schemes to compensate for unwanted displacements.

It would be possible in another embodiment of the same aspect of the invention to alternatively use velocity sensors or a combination of velocity and acceleration sensors or different numbers of sensors and at different locations. It will also be appreciated that such sensors may be used to compensate for motion disturbances in wafer probing systems which use sawyer motors (rather than a gantry system) to move one or both of the wafer chuck and the probe card platform relative to each other.

Figure 13:
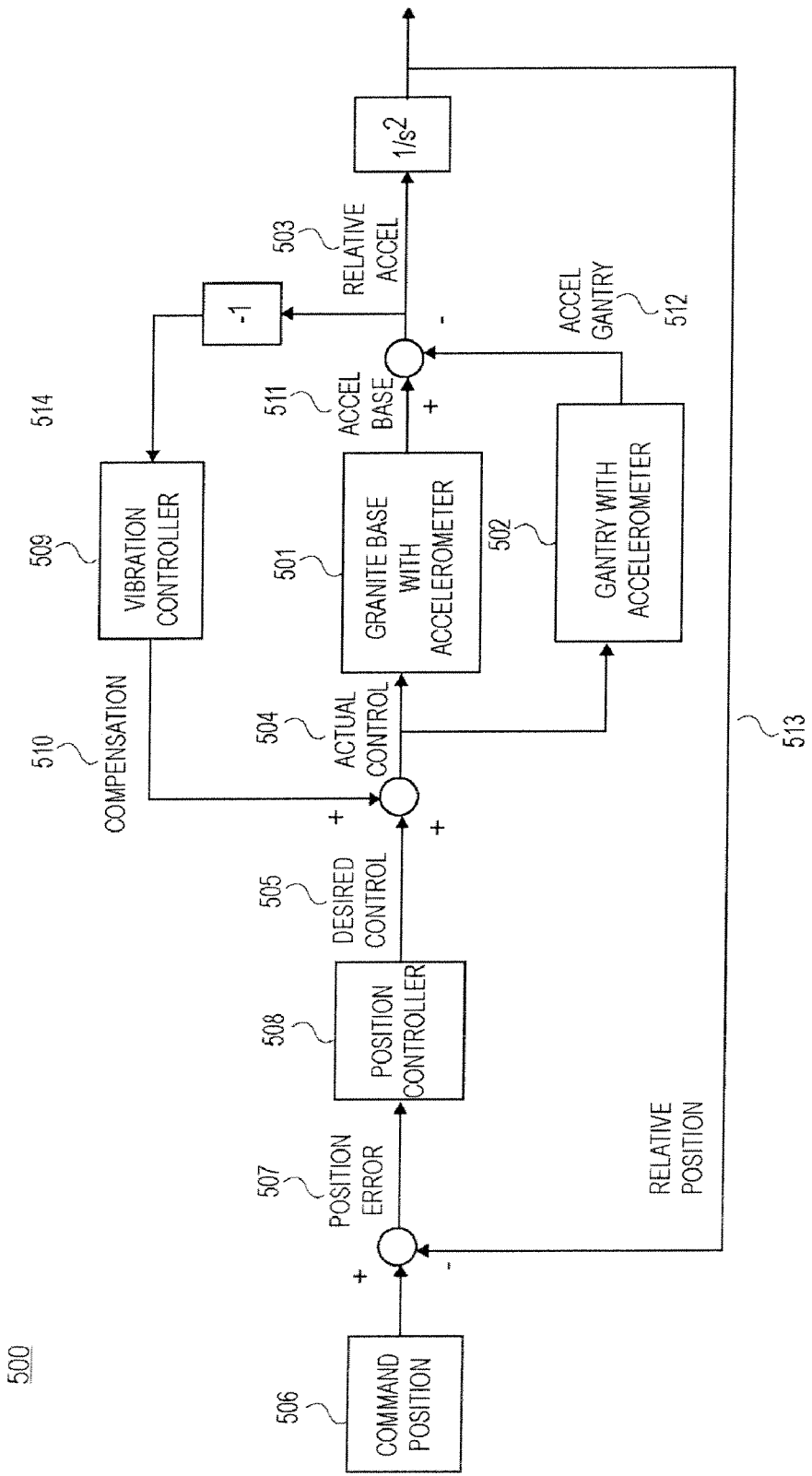
FIG. 13 illustrates a block diagram of a feedback control scheme incorporating relative acceleration compensation.

FIG. 13 shows a block diagram of a possible embodiment of a control system incorporating acceleration information from two sensors 501 and 502 located at the granite base and the gantry, respectively. This particular embodiment serves to illustrate another aspect of the invention, namely a control scheme designed to eliminate contact position disturbances during operation. In the particular illustrative embodiment shown in FIG. 13, the controller consists of two main loops: a position control loop 513 with its own position controller 508 and an acceleration control loop 514 with its own vibration controller 509.

As explained above, the Z stage is attached to the bridge of the gantry system and is floating on the granite base. The gantry is here assumed to comprise the bridge/chuck/wafer assembly 402 of FIG. 12. When the actuation motors drive the gantry forward, the same amount of traction force will act on the granite base with reverse direction (by Newton's third law of motion). This can be considered an internal disturbance. Similarly, any external disturbance acting on the base (for example from floor shaking) will also appear in the gantry because of the traction force between the gantry and the granite base. Because of the non-rigid connection between the gantry and base, vibratory relative displacements will be induced by such disturbances.

The design objective of the compensation scheme shown in FIG. 13 is to ensure that both the gantry and the granite base have the same amplitude and phase, that is, the control system is compensating for (or eliminating) the relative vibrations between the gantry and base.

For the purposes of this particular illustrative embodiment of this aspect of the invention, it will be assumed that the there is a rigid connection between the granite base and floor, and both will be viewed as a single spring-mass system with a mass $M_{EQ}$ and a stiffness $K_{EQ}$. The stiffness $K_{EQ}$ would correspond to the spring 310 shown in FIG. 12 between the base and gantry.

The floor/base structure can move relative to the mass of the gantry, which for this illustrative example will be assumed to be a linear system with mass $M_{Gantry}$ and no stiffness of its own. Based on the above assumptions, the dynamics of the gantry relative to the granite base, termed $G_{Gantry\text{-}on\text{-}Granite}$ (which will produce the relative motion between the base and gantry that the controller in FIG. 13 is designed to suppress), can be written in the frequency domain as the following transfer function:

$$G_{Gantry\text{-}on\text{-}Granite}(s) = \frac{Acc_{Relative}(s)}{F_{Actual}(s)} \quad (1)$$

$$= G_{Gantry}(s) + G_{Granite}(s)$$

$$= \frac{1}{M_{Gantry}} \left( \frac{\frac{s^2}{\omega_2^2}+1}{\frac{s^2}{\omega_1^2}+1} \right)$$

where:

$Acc_{Relative}(s)$ is the relative acceleration 503 between the base and gantry obtained by subtracting the accelerometer readings of the base 511 and gantry 512.

$F_{Actual}(s)$ is the control force 504 applied to the base and gantry resulting from the combined action of the Compensation force 510 and the Desired Control force 505.

$G_{Gantry}(s)$ is the transfer function of the dynamics of the gantry.

$G_{Granite}(s)$ is the transfer function of the dynamics of the floor/base.

$\omega_1 = \sqrt{K_{EQ}/M_{EQ}}$ is the resonant frequency of the floor/base structure.

and $\omega_2 = \sqrt{K_{EQ}/(M_{EQ}30M_{Gantry})}$ is the resonant frequency of the gantry and floor/base masses combined.

Given the resonance (or poles, obtained by calculating the roots of the denominator) of Eq. (1), which will be a combination of $\omega_1$ and $\omega_2$, it would be difficult for a servo controller (which in FIG. 13 is a combination of a Position Controller 508 and a Vibration Controller 509) to obtain perfect tracking (i.e. zero position error 507) of a commanded position 506. Therefore, it would be desirable to design a compensation 510 that will also linearize the dynamics between the Desired Control 505 and Relative Acceleration 503 signals in FIG. 13. In that case, the servo controller would have an ideal (zero) error control. In another aspect of the invention, an embodiment of the control scheme would involve such linearization.

Figure 14:
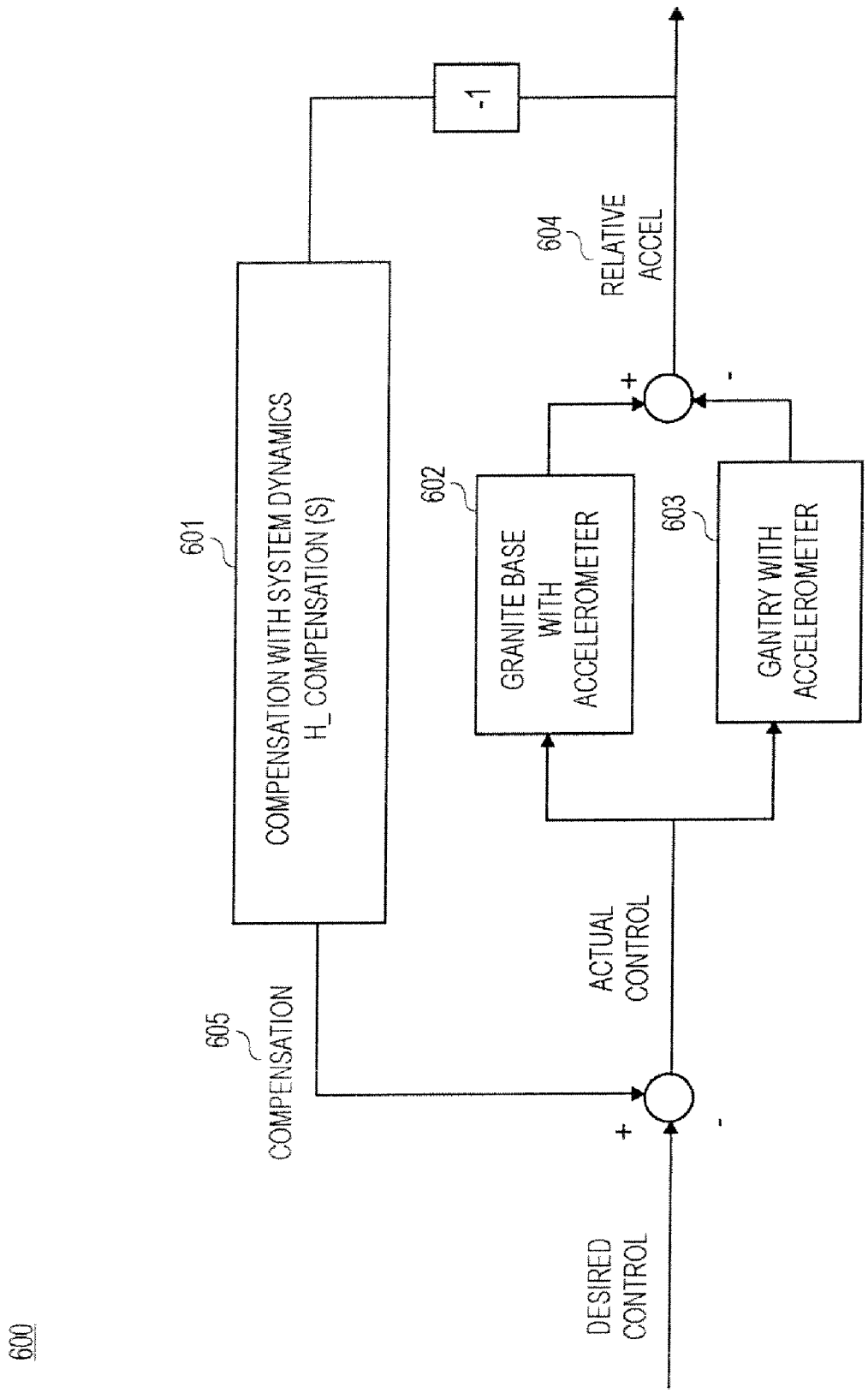
FIG. 14 shows block diagram details of an acceleration compensation scheme based on relative acceleration measurements.

FIG. 14 shows the block diagram of a possible embodiment of a compensation control 601, termed $H_{Compensation}$ (and equivalent to the Vibration Controller 509 in FIG. 13), designed to linearize the relative dynamics 604 between the base 602 and gantry 603 and thus eliminate the resonance. The resulting Compensation 605, or $F_{Compensation}$, can be designed as follows:

$$F_{Compensation} = M_{Gantry} \times Acc_{Granite} \quad (2)$$

where $Acc_{Granite}$ is the acceleration of the granite base.

Equation (2) is insensitive to the resonance frequency, as desired. Incorporating the relative dynamics of the gantry and base, $G_{Gantry\text{-}on\text{-}Granite}$, into Equation (2) the compensation control, $H_{Compensation}$ 601 can then derived as follows:

$$H_{Compensation}(s) = \frac{F_{Compensation}(s)}{Acc_{Relative}(s)} \quad (3)$$

$$= M_{Gantry} \cdot \frac{G_{Granite}(s)}{G_{Gantry\text{-}on\text{-}Granite}(s)}$$

The equivalent system dynamics with the above compensation, termed $\hat{G}_{Gantry\text{-}on\text{-}Granite}$, is then:

$$\hat{G}_{Gantry\text{-}on\text{-}Granite}(s) = \frac{G_{Gantry\text{-}on\text{-}Granite}(s)}{1 + G_{Gantry\text{-}on\text{-}Granite}(s)H_{Compensation}(s)} \quad (4)$$

Hence, the resultant system dynamics with compensation (substituting Equations (2) and (3) into Equation (4)) will be:

$$\hat{G}_{Gantry\text{-}on\text{-}Granite}(s) = \frac{1}{M_{Gantry}} \quad (5)$$

Comparing the relative dynamics with compensation $\hat{G}_{Gantry\text{-}on\text{-}Granite}$ in Equation (5) and the dynamics without compensation $G_{Gantry\text{-}on\text{-}Granite}$ in Equation (1), it is clear that the resonance caused by traction forces and external disturbances will be eliminated with the above compensation $H_{Compensation}$. In practice, $H_{Compensation}$ is expected to lead to an ideal linear system and thus to improved position tracking even when disturbances are present and continuous and during operation while the probe pins are contacting the bonding pads.

Figure 15:
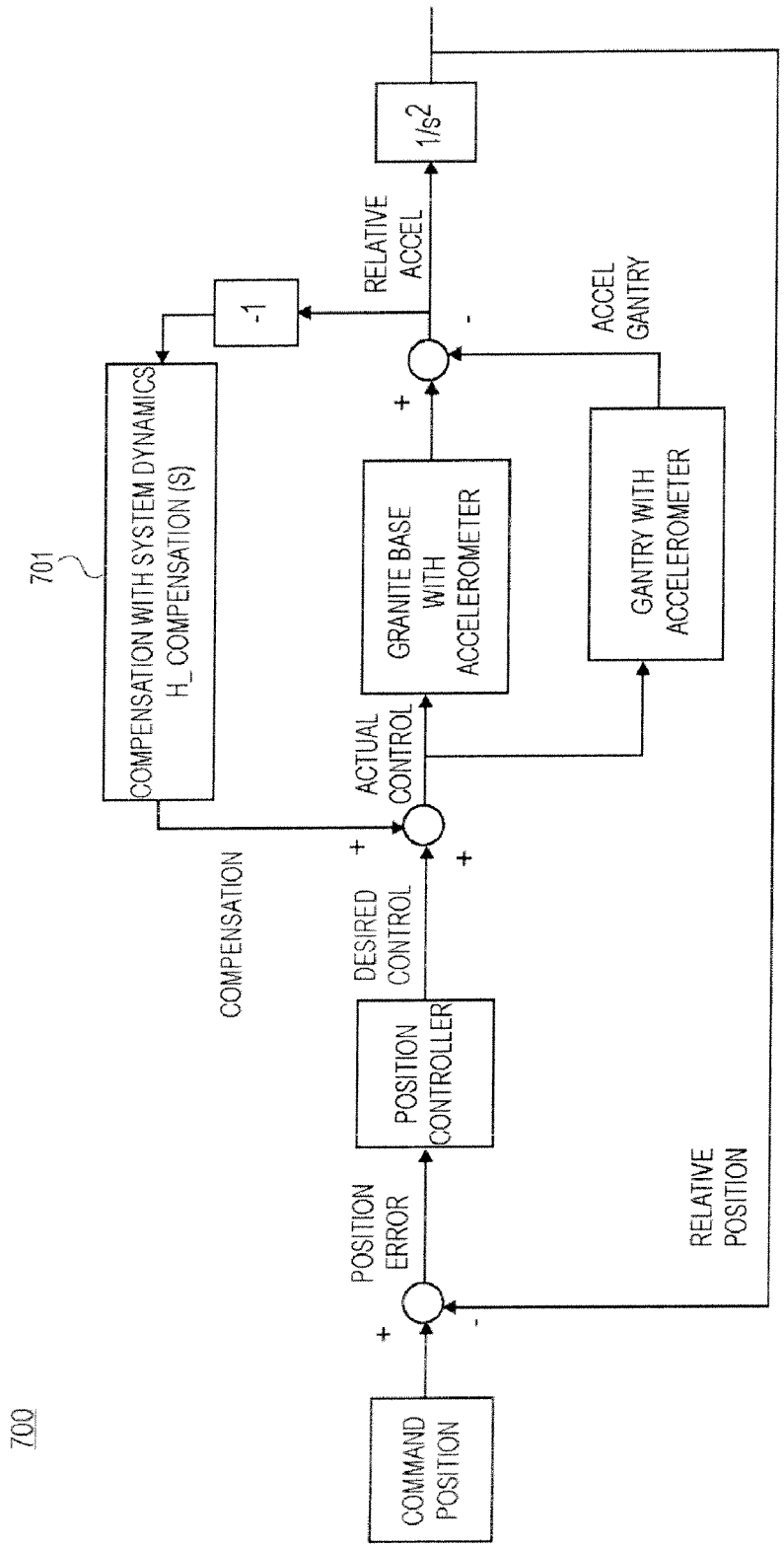
FIG. 15 shows the block diagram of the equivalent acceleration loop in FIG. 12 by adding acceleration based compensation.

FIG. 15 shows the complete control block diagram when the acceleration based compensation control 601 of FIG. 14 is incorporated 701 into the entire control scheme of FIG. 13.

Other embodiments of control systems incorporating the readings of multiple sensors of same or other kinds in order to achieve the accurate and continuous positioning of wafer pads relative to probe pins in any direction and in the presence of motion disturbances are also covered by the present invention. Similarly, other control schemes compensating for individual (non-relative) or relative accelerations of different components in the system in different ways that result in active suppression of motion disturbances in a probing system are also covered by the present invention.

Figure 16:
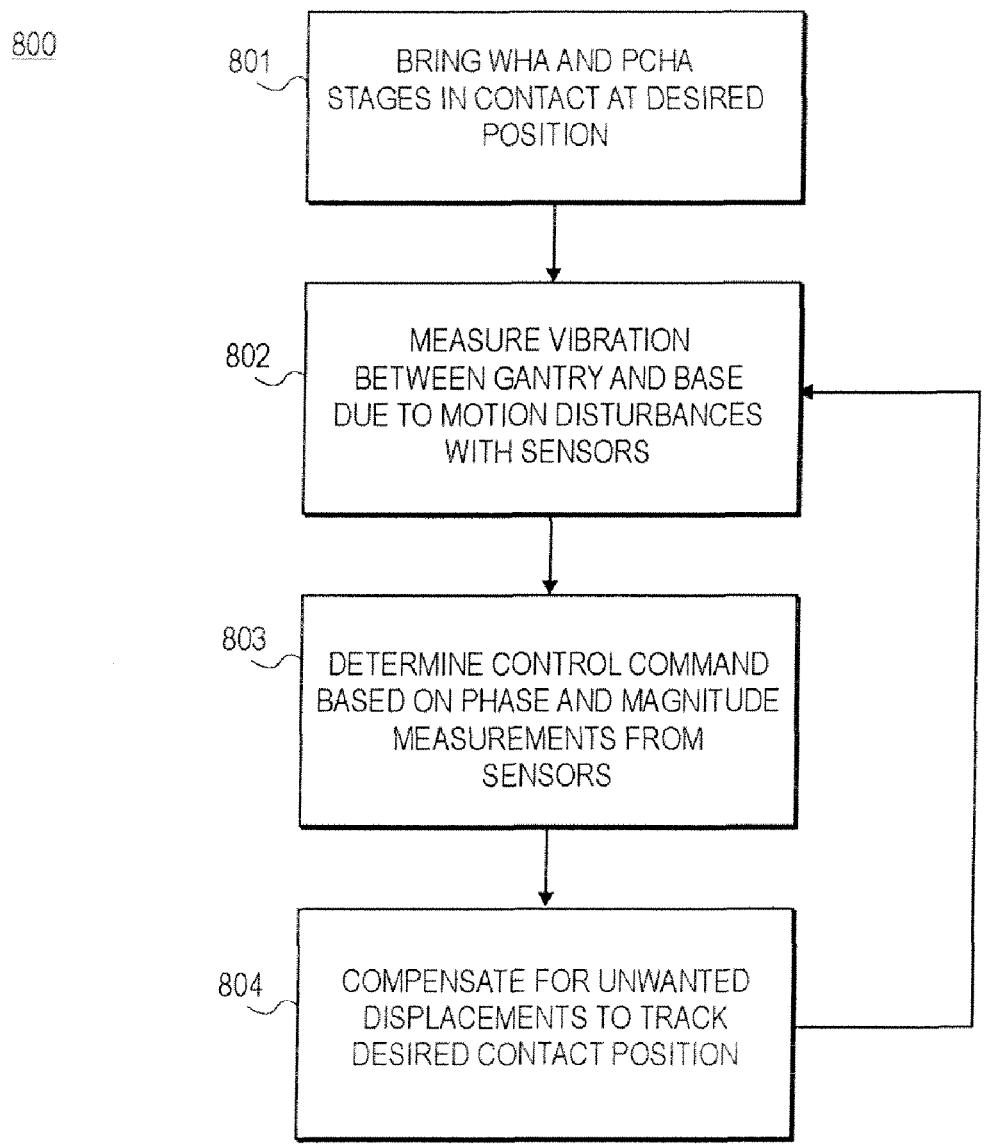
FIG. 16 illustrates a flow diagram showing exemplary operations of a testing system that accurately maintains a desired probe-to-pad position by incorporating motion disturbance sensing and compensation.

FIG. 16 is a flow diagram showing a possible embodiment of the processes involved in a testing system making use of sensors and a control system to compensate for motion disturbances on the WHA stage. As a first operation 801, the WHA and PCHA stages are brought in contact until the desired contact position and force is achieved. In order to maintain that desired contact position, any vibration (magnitude and phase) between the gantry and base are continuously measured 802 to detect changes in the desired contact position due to motion disturbances such as floor shaking or actuation of the gantry. A control system then determines the required corrective action based on the sensor information 803. The corrective forces are then applied to the gantry via actuators incorporated in the WHA stage to eliminate any unwanted position disturbances and to track the desired position 804. Operations 802-804 are continually repeated (for example every 50 milliseconds), in at least certain embodiments, to ensure that any disturbances to the desired position are promptly corrected. These operations (802-804) are also performed repeatedly (e.g. every 50 milliseconds) as the WHA and the PCHA stages are moved relative to one another in order to step from die to die to position the probe tips over a new set of bonding pads in the probing process. Other embodiments where other parameters and components of the system are monitored and controlled are also possible.

The methods described herein can be performed by a data processing system, such as a general or special purpose computer, operating under software control where the software can be stored in a variety of computer readable media.

The various embodiments of the inventions may be used on wafer probers having wafer chucks which hold full wafers or other types of probing systems such as systems which probe die or dice on film frames (which are flexible) or strips (which may be rigid).

Thus, apparatuses and methods have been provided for achieving and maintaining the accurate pad to probe contact positioning in a testing system in the presence of disturbances. Although the present invention has been described with reference to specific exemplary embodiments, it will be evident that various modifications and changes may be made to these embodiments without departing from the broader spirit and scope of the invention as set forth in the claims. Accordingly the specification and drawings are to be regarded in an illustrative rather than a restrictive manner.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of moving a wafer stage comprising:
moving a wafer stage of a probing system in a first direction through a clearance height, wherein moving the wafer stage through the clearance height changes a distance between the wafer stage and a probe tip of the probing system;
moving, only after moving the wafer stage through the clearance height, the wafer stage to a bottom point in the first direction while moving the wafer stage in a second direction, wherein the second direction is perpendicular to the first direction; and
moving, after moving the wafer stage to the bottom point, the wafer stage in a third direction, wherein the third direction is parallel and opposite to the first direction.

2. The method of claim 1, wherein the wafer stage pauses after moving in the third direction, before moving in the second direction to a settle check point.

3. The method of claim 1, wherein moving the wafer stage in the third direction occurs simultaneously with moving the wafer stage in the second direction to a settle check point.

4. The method of claim 1, further comprising allowing the wafer stage to settle at a settle check point before moving the wafer stage in the third direction to a contact position.

5. The method of claim 1, wherein the wafer stage reaches the bottom point before moving through a midpoint between two contact positions.

6. The method of claim 4, wherein the wafer stage only has one settle check point between moving the wafer stage through the clearance height to the contact position.

7. The method of claim 4, wherein the wafer stage has a motion profile with a check point and the settle check point between moving the wafer stage through the clearance height to the contact position.

8. The method of claim 4, wherein the wafer stage moves in a curved non-parabolic motion while the wafer stage moves in the second direction to arrive at the settle check point.

9. A machine readable medium having stored thereon data representing sequences of instructions, which when executed by a computer system cause the computer system to perform a method comprising:
moving a wafer stage of a probing system in a first direction through a clearance height, wherein moving the wafer stage through the clearance height changes a distance between the wafer stage and a probe tip of the probing system;
moving, only after moving the wafer stage through the clearance height, the wafer stage to a bottom point in the first direction while moving the wafer stage in a second direction, wherein the second direction is perpendicular to the first direction; and
moving, after moving the wafer stage to the bottom point, the wafer stage in a third direction, wherein the third direction is parallel and opposite to the first direction.

10. A wafer probing apparatus comprising:
a support frame;
a base supported by the support frame;
a wafer stage supported by the base, the wafer stage being configured to move in a three-dimensional coordinate system having three axes of motion;
at least one motor connected with the wafer stage for moving the wafer stage in the three-dimensional coordinate system, the at least one motor being configured to move the wafer stage in a first axis of motion through a clearance height to a bottom point while simultaneously moving the wafer stage in a second axis of motion to the bottom point; and
at least one sensor coupled with the wafer stage, the sensor being configured to measure a wafer stage position.

11. The apparatus of claim 10, wherein the at least one motor is a brushless motor.

12. The apparatus of claim 10, wherein the at least one motor is a sawyer motor.

13. A method of moving a wafer stage comprising:
accelerating a wafer stage of a probing system in a first direction before moving the wafer stage through a clearance height, wherein moving the wafer stage through the clearance height changes a distance between the wafer stage and a probe tip of the probing system;
accelerating the wafer stage in a second direction while moving the wafer stage in the first direction; and
accelerating the wafer stage in a third direction, wherein the first direction is perpendicular to the second direction and is parallel and opposite to the third direction.

14. The method of claim 13, wherein accelerating the wafer stage in the first direction occurs over an acceleration distance of about two-thirds of a total travel distance of the wafer stage in the first direction.

15. The method of claim 13, further comprising decelerating the wafer stage in the first direction after accelerating the wafer stage in the first direction, wherein decelerating the wafer stage in the first direction occurs over a deceleration distance of about one-third of a total travel distance of the wafer stage in the first direction.

16. The method of claim 13, further comprising decelerating the wafer stage in the first direction after accelerating the wafer stage in the first direction, wherein decelerating the wafer stage in the first direction occurs over a deceleration distance that is at most one-half of an acceleration distance of the wafer stage in the first direction.

17. The method of claim 13, wherein the clearance height is a distance from a contact position, wherein after moving the wafer stage through the clearance height the wafer stage can move in the second direction without causing contact with the probe tip.

18. The method of claim 17, wherein the probe tip is disposed on a probing system component selected from the group consisting of a probe card and a probe pin.

19. The method of claim 17, wherein the clearance height is at least 125 microns from the contact position.

20. The method of claim 13, further comprising determining whether movement of the wafer stage in the second direction is below a threshold value before continuing to move the wafer stage further in the third direction.

21. The method of claim 13, wherein accelerating the wafer stage in the first direction occurs at a maximum possible acceleration rate.

22. The method of claim 13, wherein moving the wafer stage in the first direction while accelerating the wafer stage in the second direction is achieved by adjusting a parameter of at least one motor and coasting the wafer stage in the first direction.

23. A method of moving a wafer stage comprising:
accelerating a wafer stage of a probing system in a vertical direction over a first time period before moving the wafer stage through a clearance height, wherein moving the wafer stage through the clearance height changes a distance between the wafer stage and a probe tip of the probing system;
decelerating the wafer stage in the vertical direction during a second time period, wherein the first time period is greater than the second time period; and
accelerating the wafer stage in a horizontal direction while decelerating the wafer stage in the vertical direction.

24. A machine readable medium having stored thereon data representing sequences of instructions, which when executed by a computer system cause the computer system to perform a method comprising:
accelerating a wafer stage of a probing system in a first direction before moving the wafer stage through a clearance height; wherein moving the wafer stage through the clearance height changes a distance between the wafer stage and a probe tip of the probing system;
accelerating the wafer stage in a second direction while moving the wafer stage in the first direction; and
accelerating the wafer stage in a third direction, wherein the first direction is perpendicular to the second direction and is parallel and opposite to the third direction.

25. A probing system comprising:
a base;
a wafer stage supported by the base, the wafer stage being configured to move in a three-dimensional coordinate system;
at least one motor connected with the wafer stage for moving the wafer stage in the three-dimensional coordinate system, the at least one motor being configured to accelerate the wafer stage in a first direction before moving the wafer stage through a clearance height and the at least one motor being configured to accelerate the wafer stage in a second direction while moving the wafer stage in the first direction, wherein moving the wafer stage through the clearance height changes a distance between the wafer stage and a probe tip of the probing system;
at least one sensor coupled with the wafer stage, the sensor being configured to measure a wafer stage parameter; and
a control system being configured to receive information from the at least one sensor and determine operating parameters of the at least one motor based on a clearance height parameter.

* * * * *